United States Patent
Jung et al.

(10) Patent No.: US 12,196,568 B2
(45) Date of Patent: Jan. 14, 2025

(54) METHOD OF PROVIDING IMAGE BY VEHICLE NAVIGATION DEVICE

(71) Applicant: LG ELECTRONICS INC., Seoul (KR)

(72) Inventors: Dukyung Jung, Seoul (KR); Kihyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 17/755,585

(22) PCT Filed: Nov. 1, 2019

(86) PCT No.: PCT/KR2019/014677
§ 371 (c)(1),
(2) Date: May 2, 2022

(87) PCT Pub. No.: WO2021/085691
PCT Pub. Date: May 6, 2021

(65) Prior Publication Data
US 2022/0364874 A1    Nov. 17, 2022

(51) Int. Cl.
*G01C 21/36* (2006.01)
*G06T 7/80* (2017.01)
*G06T 19/00* (2011.01)

(52) U.S. Cl.
CPC ..... *G01C 21/3602* (2013.01); *G01C 21/3638* (2013.01); *G01C 21/3647* (2013.01);
(Continued)

(58) Field of Classification Search
None
See application file for complete search history.

(56) References Cited

U.S. PATENT DOCUMENTS 9,207,087 B2* 12/2015 Kim .................. G01C 21/3602
10,317,237 B2* 6/2019 Harayama ............ G09B 29/102
(Continued)

FOREIGN PATENT DOCUMENTS

KR    10-1019915    3/2011
KR    1020120012104    2/2012
(Continued)

OTHER PUBLICATIONS

PCT International Application No. PCT/KR2019/014677, Search Report dated Jul. 28, 2020, 3 pages.
(Continued)

*Primary Examiner* — Todd Melton
(74) *Attorney, Agent, or Firm* — LEE, HONG, DEGERMAN, KANG & WAIMEY

(57) ABSTRACT

Disclosed is an AR image provision method of a vehicle navigation system, including transmitting, by a processor, information on a guide point or vehicle speed information to an external server, searching, by an external server, for candidate vehicles based on the information on the guide point or the vehicle speed information, selecting, by the external server, an image providing vehicle from among the candidate vehicles according to priority set by the processor, generating, by the external server, a graphical object to be displayed in a camera image received from the image providing vehicle using augmented reality (AR), and displaying, by the processor, AR image information on the guide point including the camera image and the graphical object on a navigation screen.

20 Claims, 18 Drawing Sheets

(52) U.S. Cl.
CPC ......... *G01C 21/365* (2013.01); *G01C 21/367* (2013.01); *G06T 7/80* (2017.01); *G06T 19/006* (2013.01); *G06T 2207/30252* (2013.01)

(56) References Cited

U.S. PATENT DOCUMENTS 10,488,215 B1 * 11/2019 Yu ........................ G01C 21/365
2014/0324247 A1    10/2014 Jun

FOREIGN PATENT DOCUMENTS

| KR | 10112183 | 3/2012 |
| KR | 10-2012-0092352 | 8/2012 |
| KR | 10-2012-0092850 | 8/2012 |
| KR | 1020170121562 | 11/2017 |
| KR | 10-2019-0106903 | 9/2019 |

OTHER PUBLICATIONS

Korean Intellectual Property Office Application No. 10-2022-7005874, Office Action dated May 21, 2024, 10 pages.

* cited by examiner

[Fig. 1]
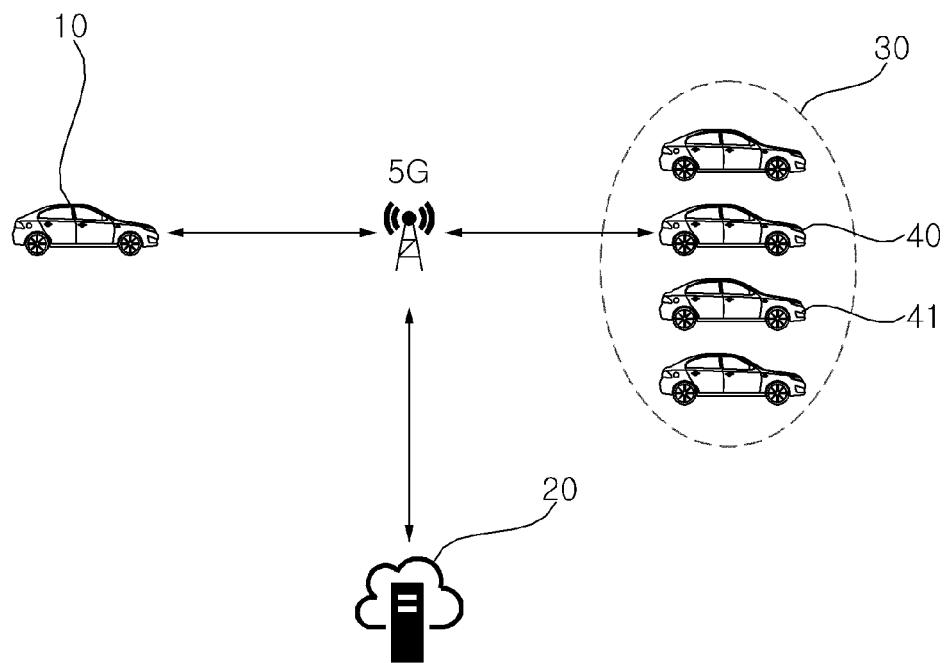

[Fig. 2]
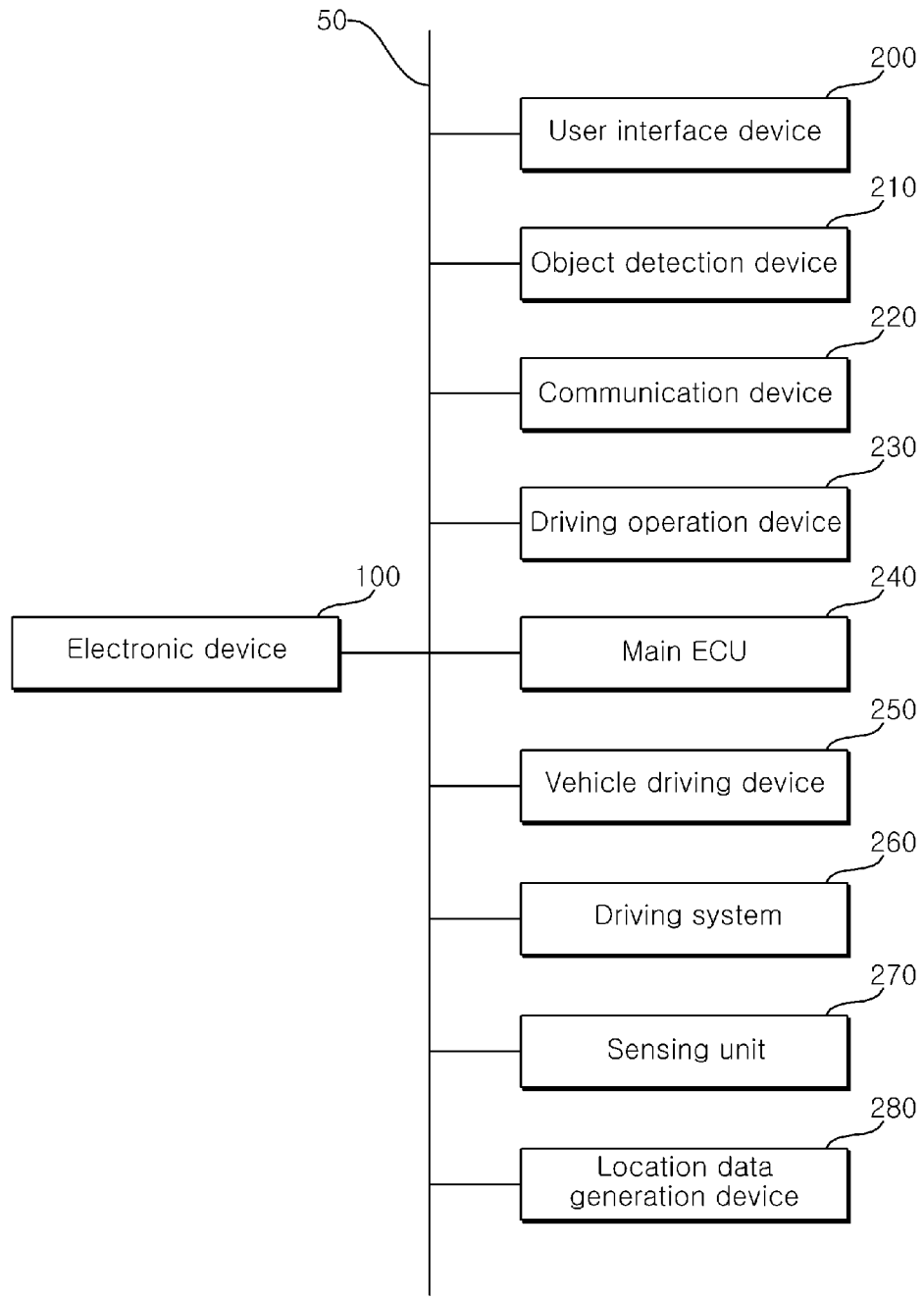

[Fig. 3]
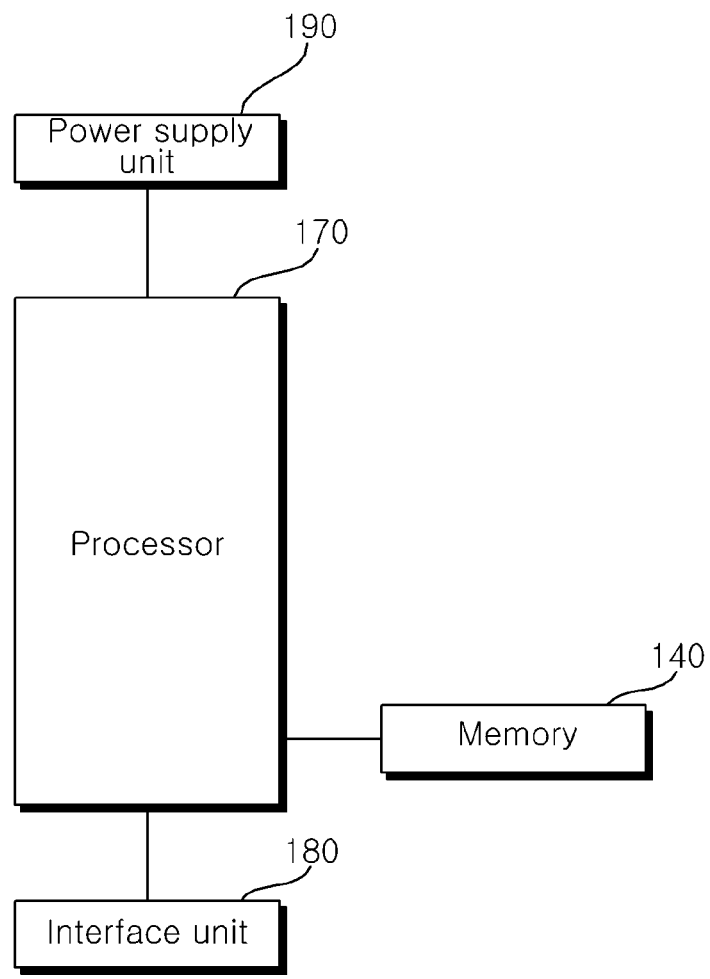

[Fig. 4]
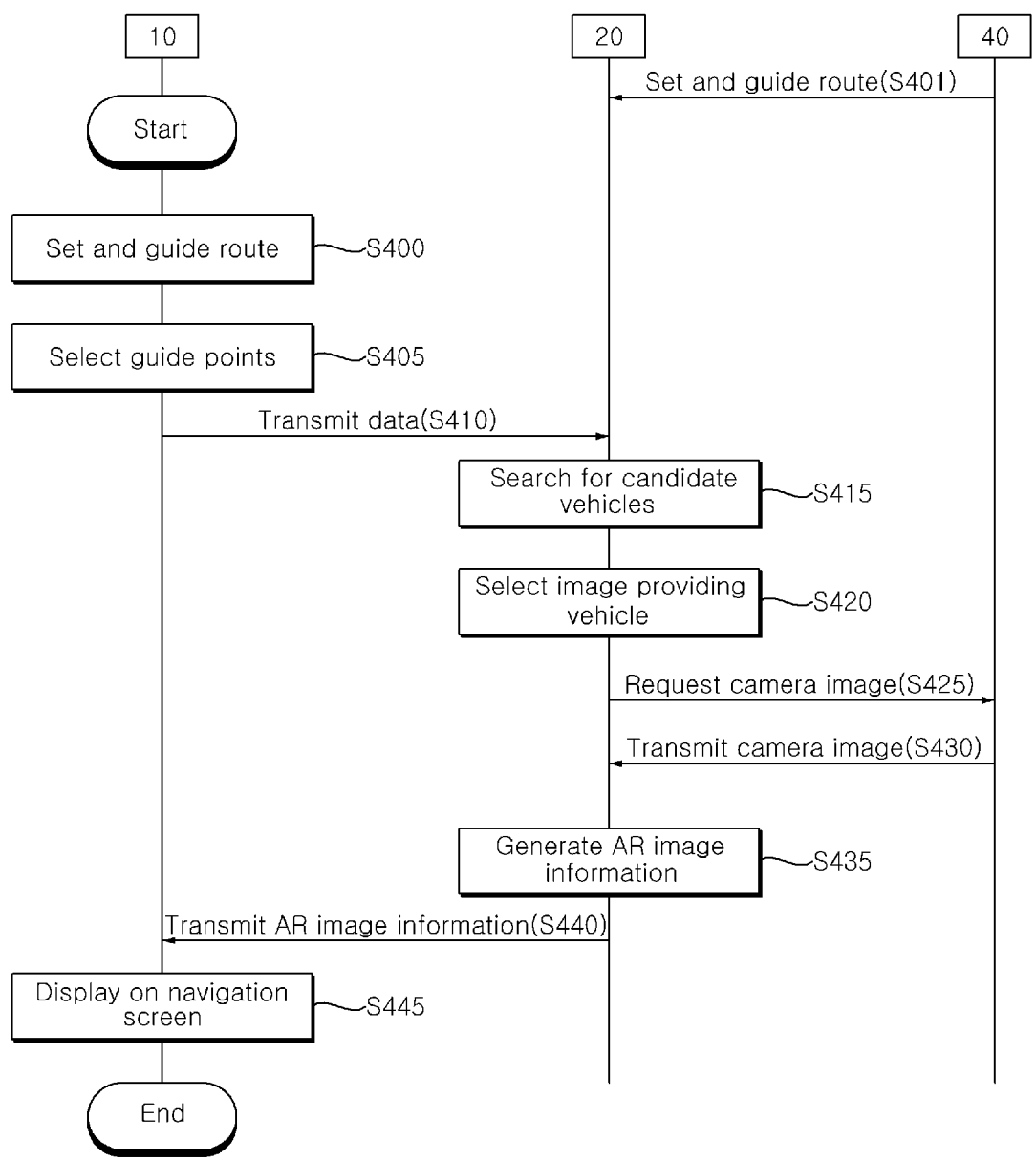

[Fig. 5]
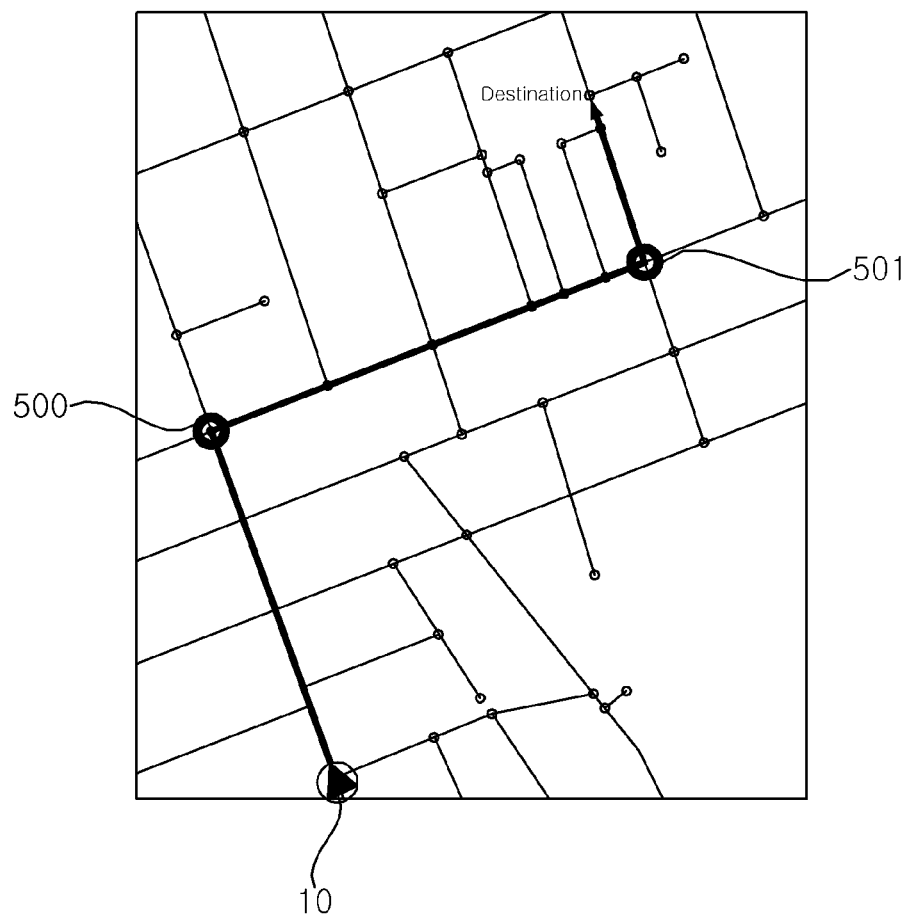

【Fig. 6】
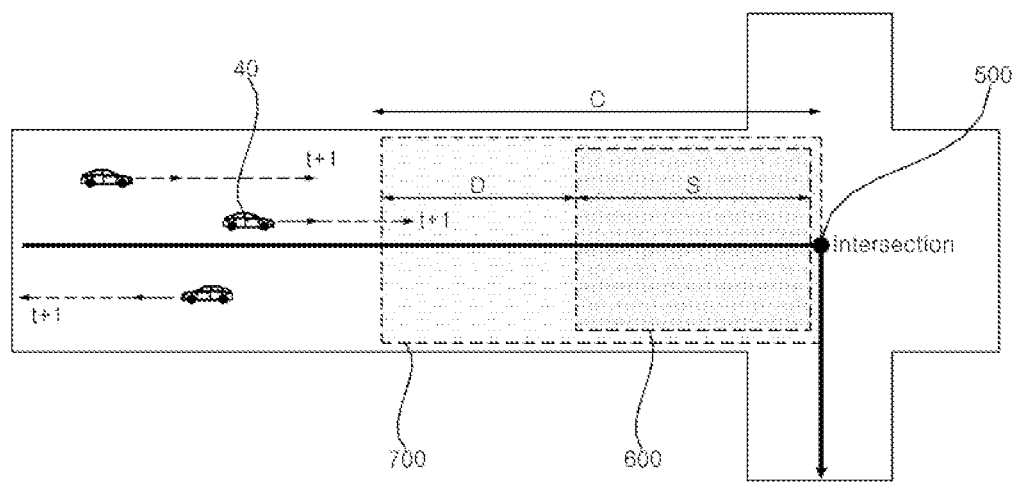

[Fig. 7]
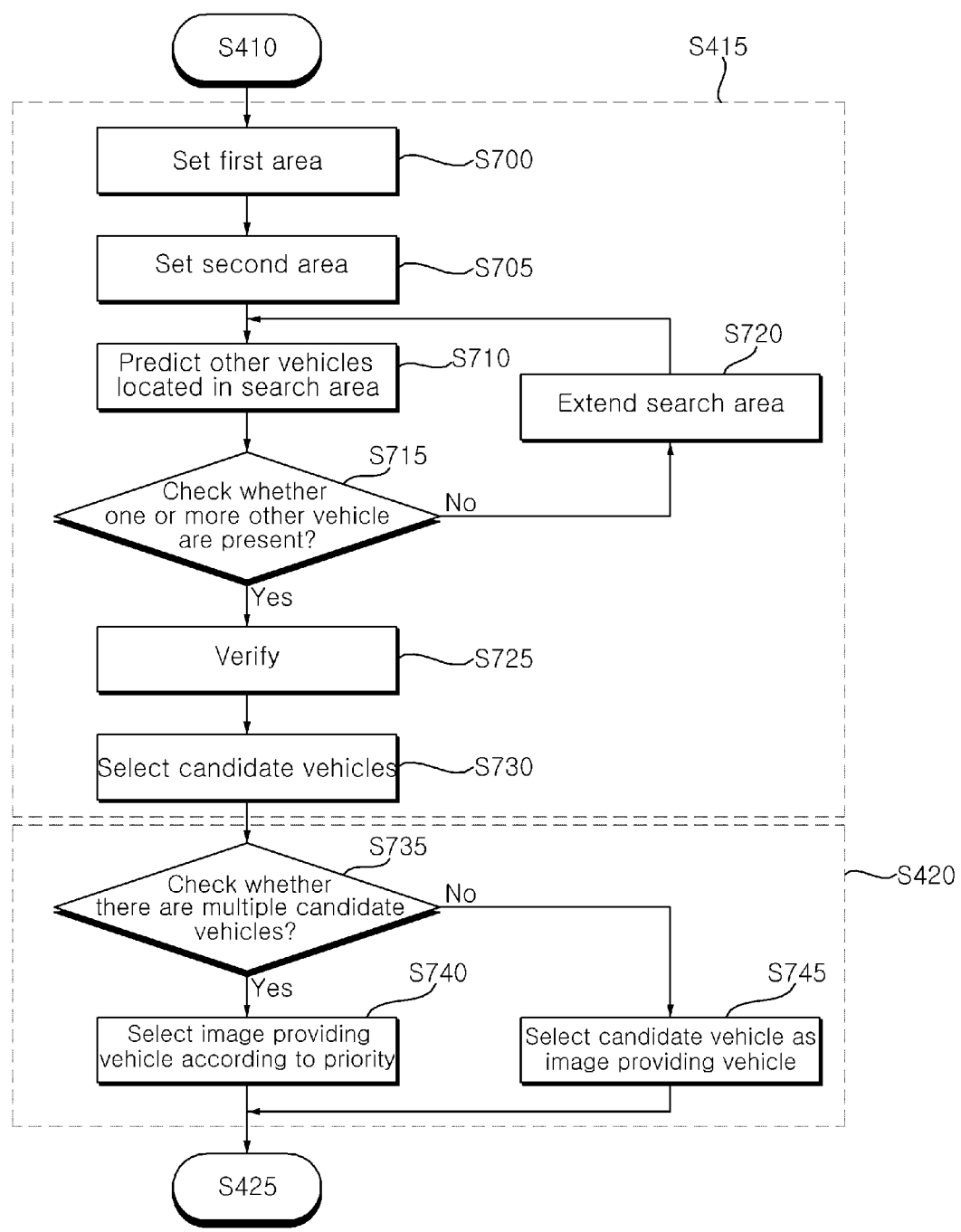

【Fig. 8】
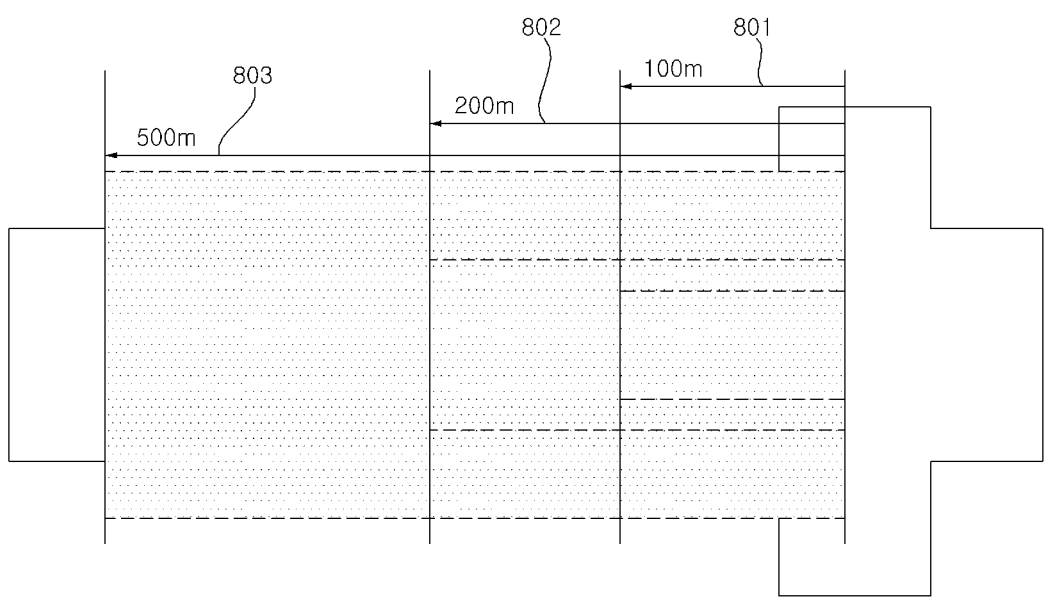

[Fig. 9]
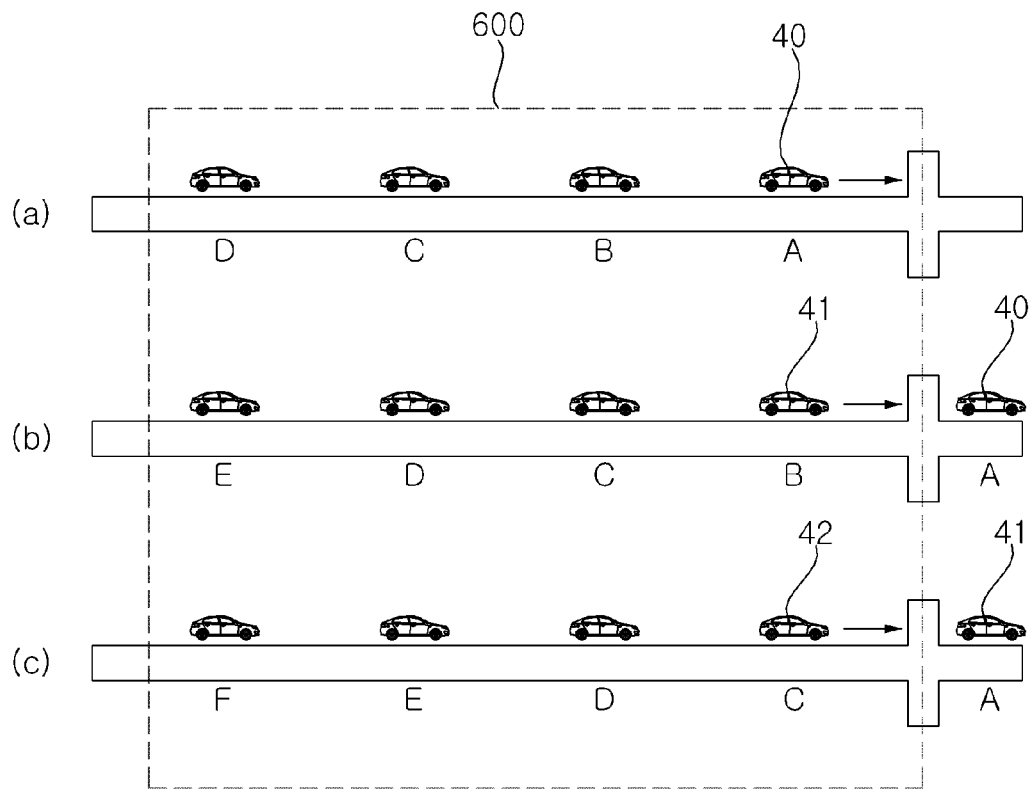

【Fig. 10】
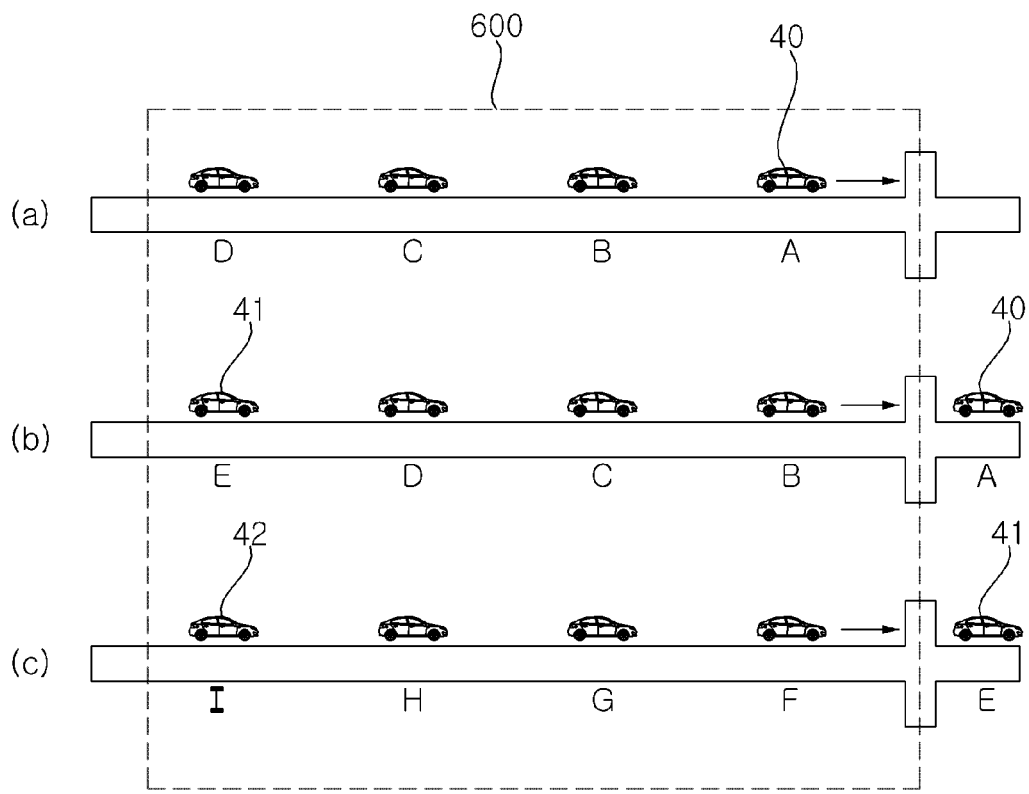

【Fig. 11a】
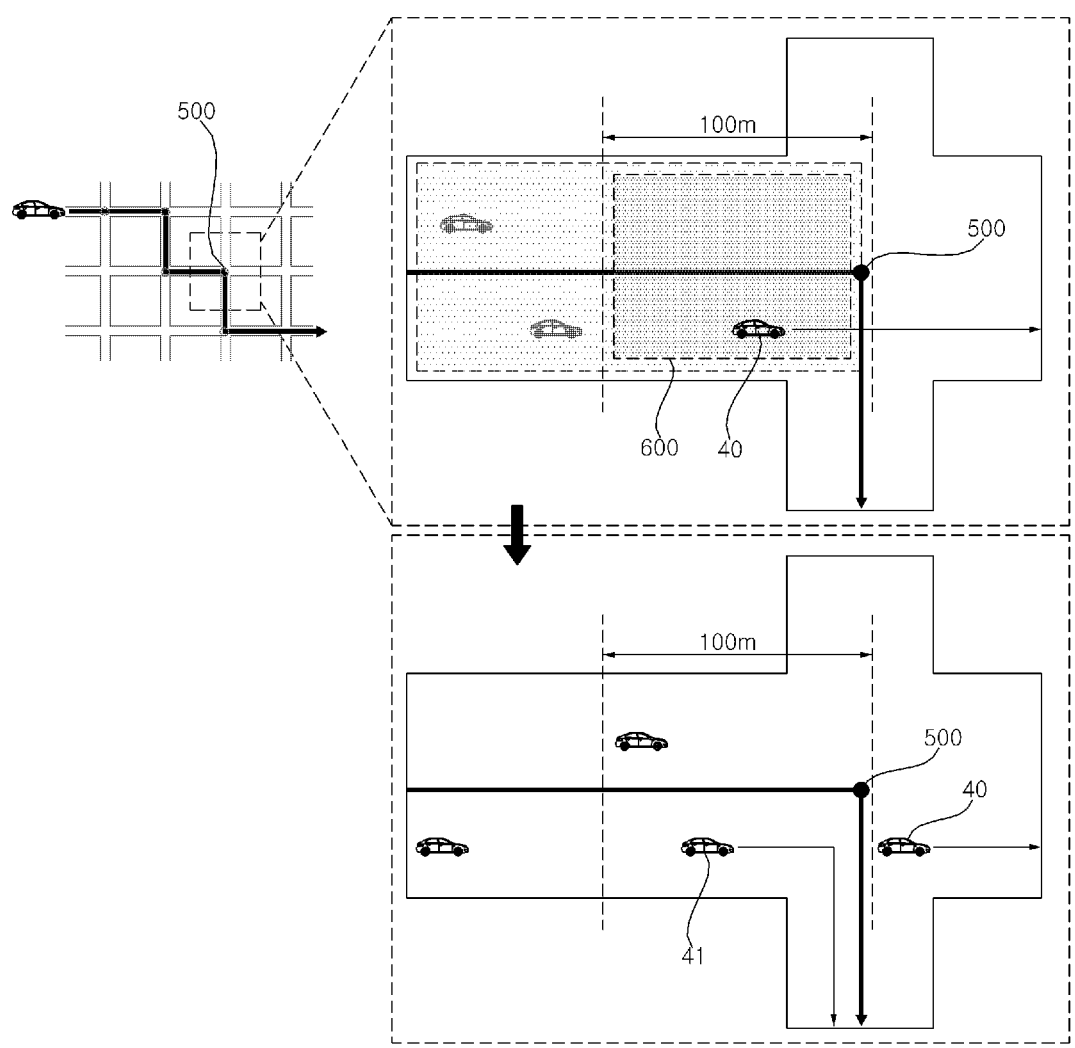

【Fig. 11b】
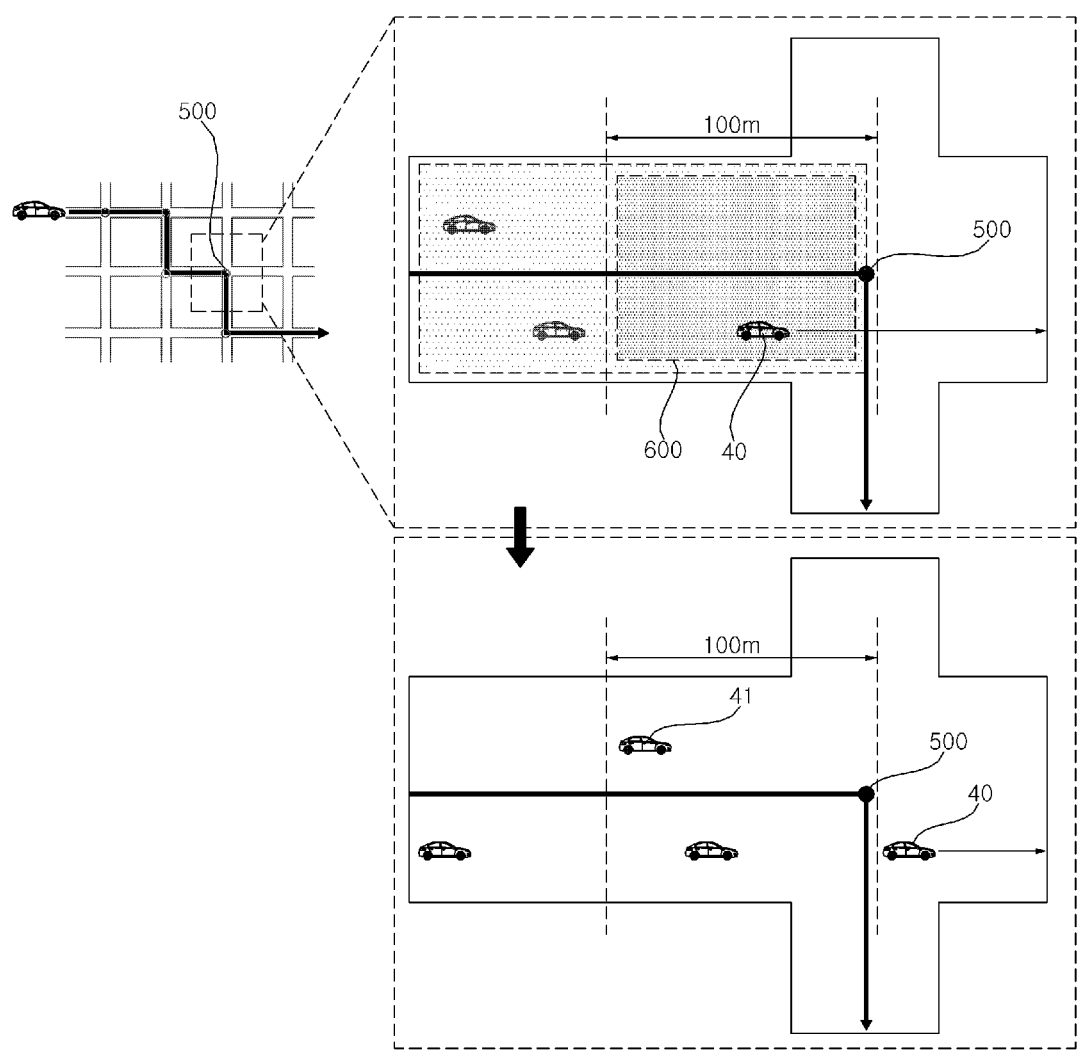

[Fig. 12]
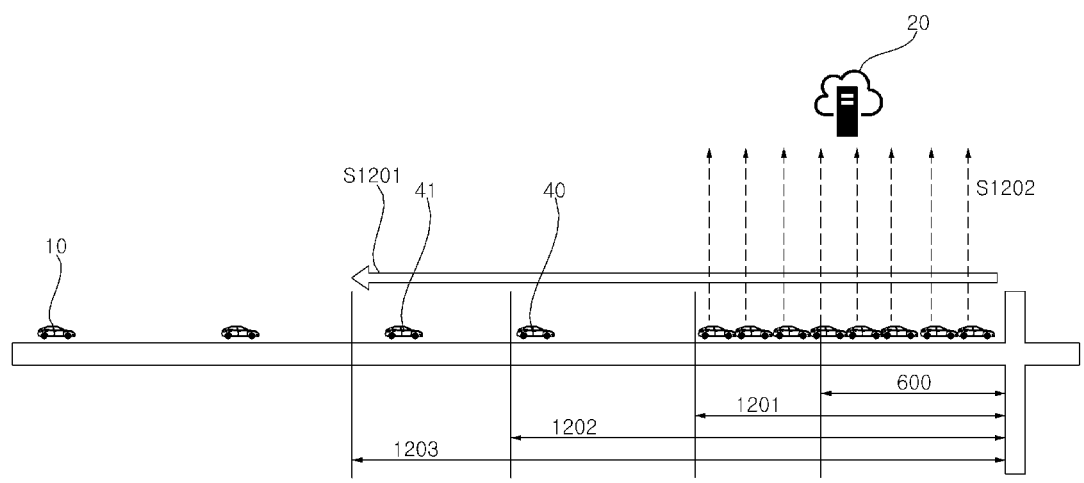

【Fig. 13】
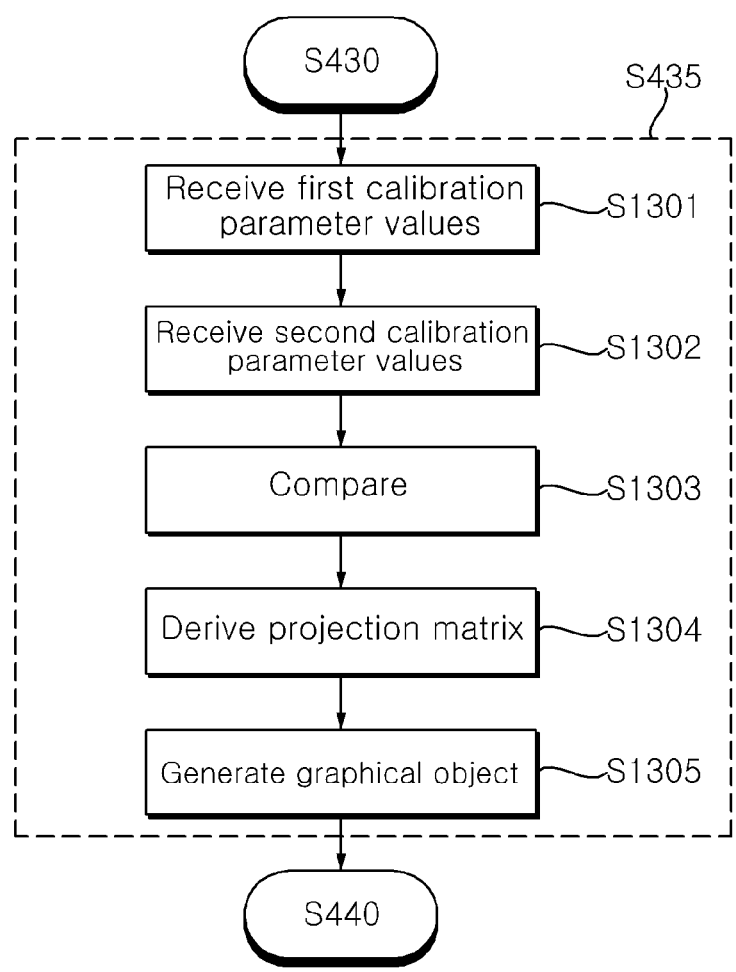

[Fig. 14]
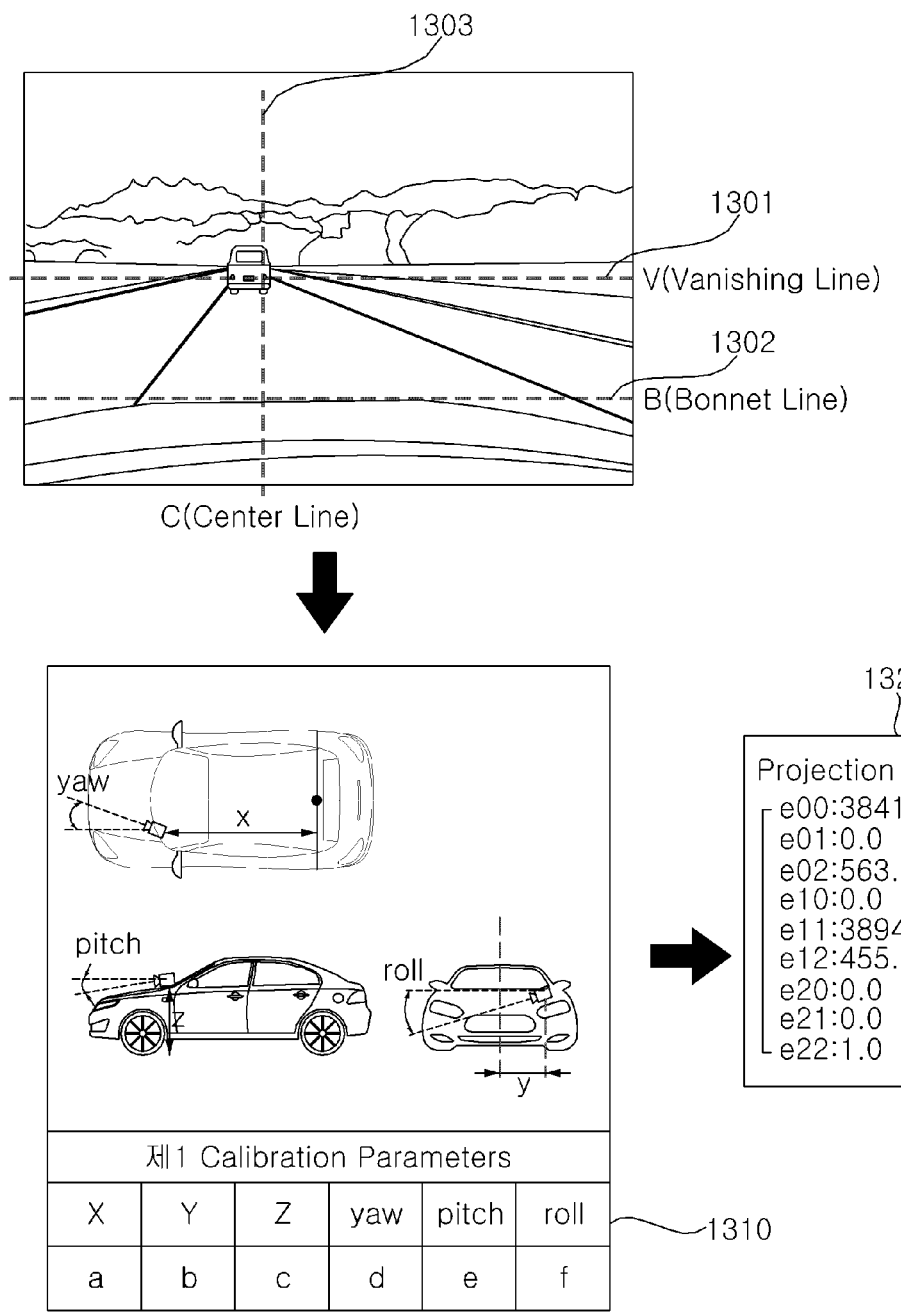

[Fig. 15]
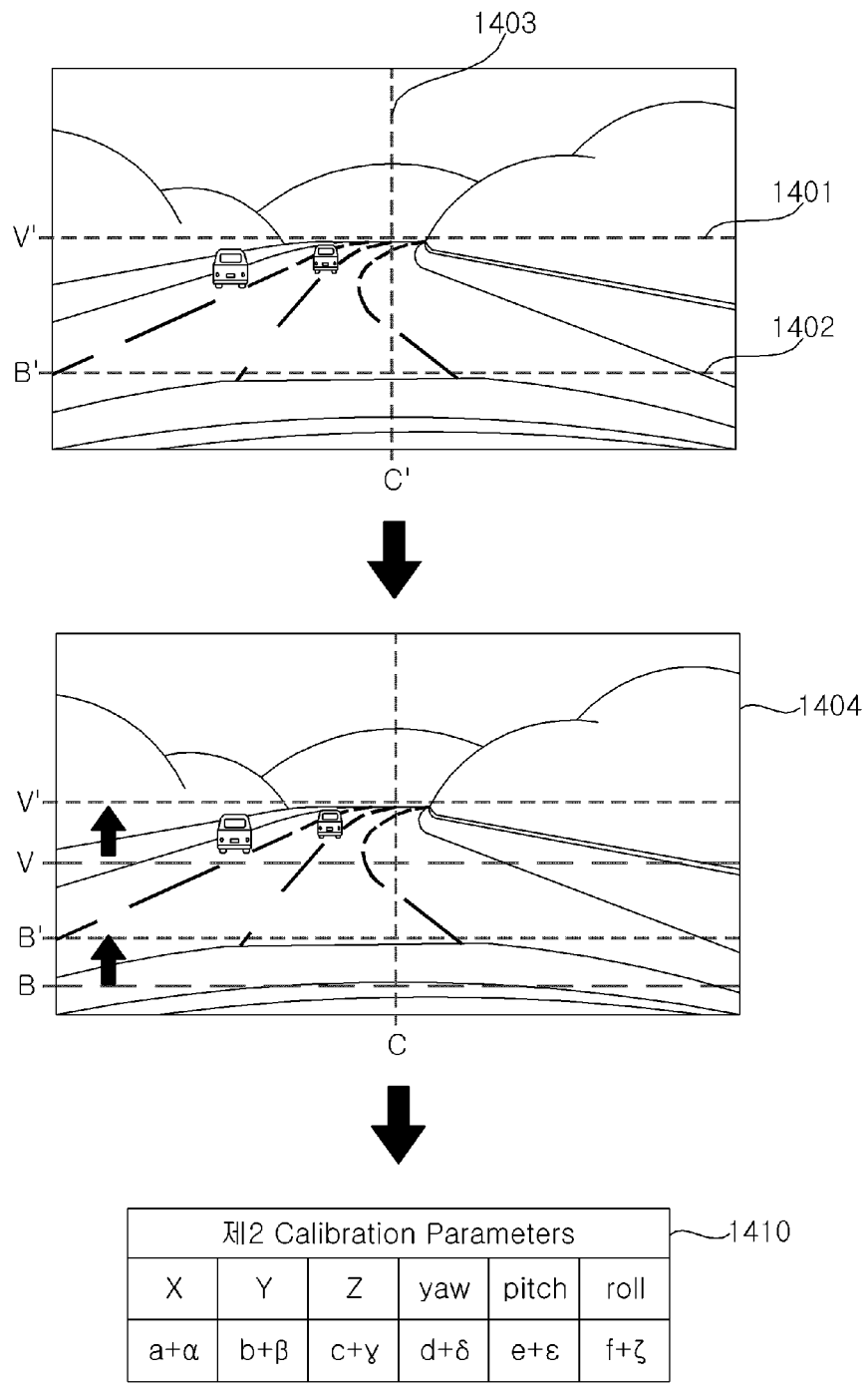

[Fig. 16]
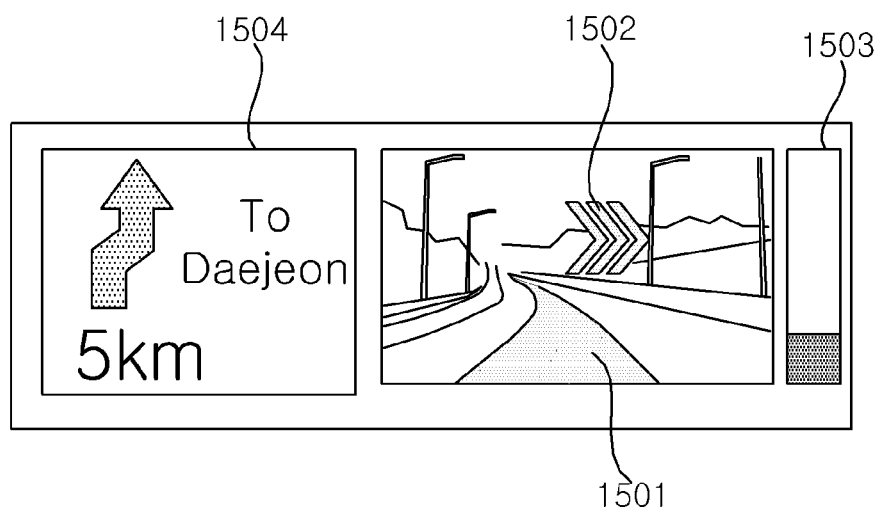

【Fig. 17】
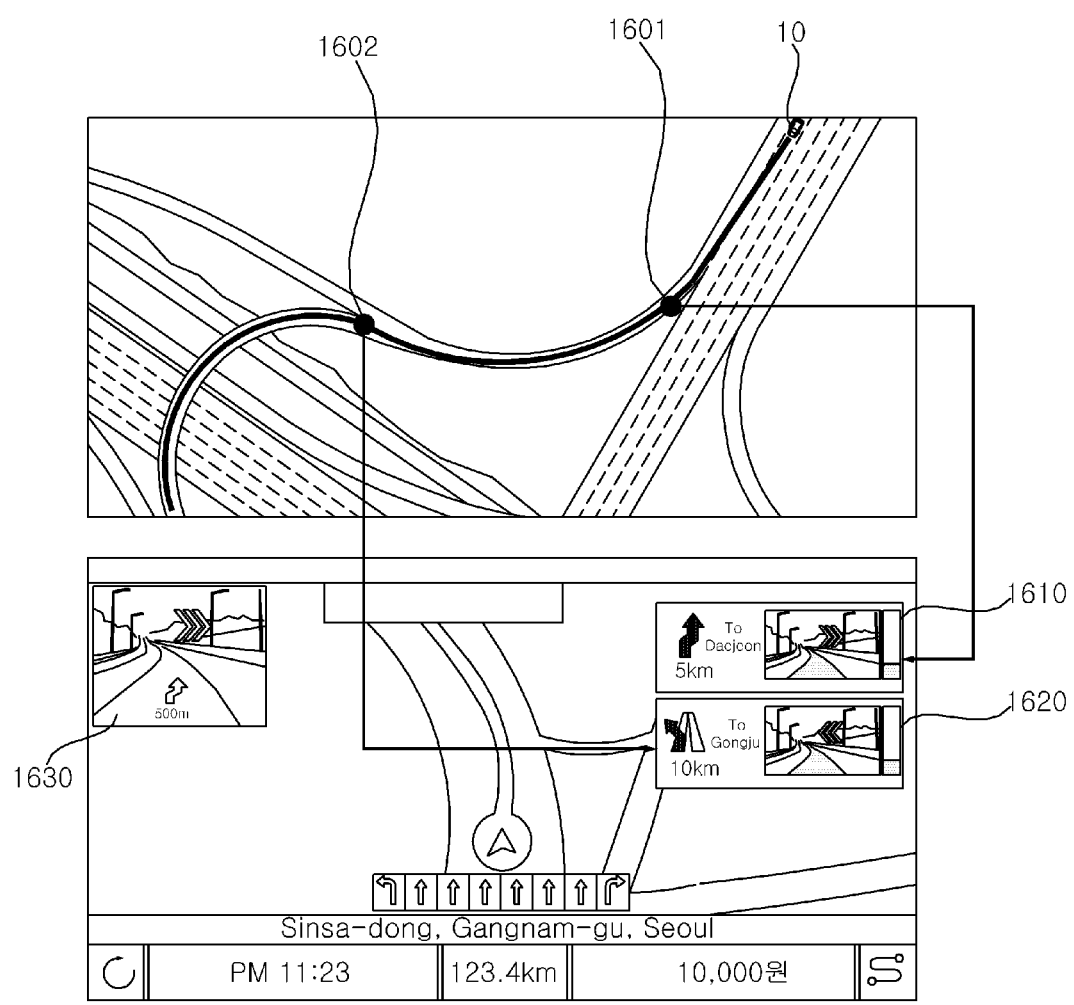

METHOD OF PROVIDING IMAGE BY VEHICLE NAVIGATION DEVICE

CROSS-REFERENCE TO RELATED APPLICATIONS

This application is the National Stage filing under 35 U.S.C. 371 of International Application No. PCT/KR2019/014677, filed on Nov. 1, 2019, the contents of which are all incorporated by reference herein in its entirety.

TECHNICAL FIELD

The present disclosure relates to an image provision method of a vehicle navigation system, and more specifically, to a method of displaying augmented reality (AR) content on an image supplied from another vehicle expected to pass through a guide point and providing the same to a user.

BACKGROUND ART

A vehicle is a device that moves an on-board user in a desired direction. A typical example is a car. An autonomous vehicle refers to a vehicle that can automatically travel without human operation.

A navigation system, which is a road and traffic information providing system that guides an optimal route selected in consideration of a distance and traffic conditions from the current location to a destination, has become common because the demand has increased due to various conveniences and functions. Although there are various types of navigation systems, a general navigation system is configured in such a manner that a GPS receiver obtains current location information of a vehicle from four or more satellites, and a two-dimensional map screen is displayed through a map matching technique using the location information and electronic map data constructed in advance.

However, this method has problems that it is difficult to secure an accurate view in the direction in which a vehicle is actually moving when the electronic map is displayed on the screen in real time, unnecessary information is also displayed, there is a discrepancy between a displayed screen and real objects because image data is not loaded on the screen at a moving speed at a proper time, and there is inconvenience due to a difference between an actual three-dimensional environment and a two-dimensional map.

Accordingly, a three-dimensional electronic map has been introduced. However, it is difficult to implement and modify the three-dimensional electronic map, and the three-dimensional electronic map requires a high manufacturing cost, a larger map data space than a two-dimensional electronic map, and more information processing in a location update process, and thus there is a problem in that a real environment and a three-dimensional image on the screen are easily mismatched. Accordingly, a navigation system using augmented reality has appeared. Augmented reality (AR) technology is a technology for synthesizing a real environment and a virtual object or information such that the virtual object or information looks like an object existing in the real environment.

An "augmented reality navigation system" refers to a navigation system implemented using an augmented reality technique of capturing images of a road on which a vehicle is currently traveling uses a camera attached to the vehicle and overlaying a virtual route line on the images of the road. That is, the augmented reality navigation system is a system that represents a destination or a point of interest on an actual image viewed through the camera based on a GPS sensor, a magnetic field sensor, an orientation sensor, and the like.

However, this system is also based on actual images viewed through a camera, and thus driving guidance information for a long distance cannot be checked because images captured by the camera are limited to a certain distance depending on the performance of the camera. In addition, traffic information at an intersection of interest can be checked using TPEG, XM, TMC, etc., but there is a delay at a certain interval, and actual road images cannot be viewed. Although actual road images can be checked using a road CCTV, there are problems in that the area is limited and there is a delay at regular intervals.

Meanwhile, 5G communication is a mobile communication service with a maximum speed of 20 Gbps, which is 20 times faster than the maximum speed (1 Gbps) of LTE and has 100 times more processing capacity. Ultra-low latency (delay time of 1 ms) and hyper-connectivity are strengths, and based on these, autonomous driving can be realized using 5G, and thus research thereon is being actively conducted.

DISCLOSURE

Technical Problem

Therefore, the present invention has been made in view of the above problems, and it is an object of the present disclosure to provide an image provision method for transmitting a real-time image from a camera of each vehicle passing through an intersection to an external server using 5G communication technology and providing the real-time image of each intersection from the external server to a vehicle that requests the real-time image.

It is another object of the present disclosure to provide an AR image provision method for providing AR content along with a real-time image of each intersection.

It is a further object of the present disclosure to provide an AR image provision method capable of preparing for the next guidance through real-time images and AR content in the case of composite guidance such as guidance for turning left immediately after turning right.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In accordance with an aspect of the present invention, the above and other objects can be accomplished by the provision of an AR image provision method of a vehicle navigation system, including transmitting, by a processor, information on a guide point or vehicle speed information to an external server, searching, by an external server, for candidate vehicles based on the information on the guide point or the vehicle speed information, selecting, by the external server, an image providing vehicle from among the candidate vehicles according to priority set by the processor, generating, by the external server, a graphical object to be displayed in a camera image received from the image providing vehicle using augmented reality (AR), and displaying, by the processor, AR image information on the guide point including the camera image and the graphical object on a navigation screen.

Furthermore, the AR image provision method may include a step in which the processor and the external server transmit/receive information to/from each other through 5G communication.

Furthermore, the AR image provision method includes a step in which the external server divides the guide point into a first point and a second point and generates first AR image information on the first point and second AR image information on the second point upon determining that the guide point is a point requiring a plurality of turn guides, and displaying the first AR image information and the second AR image information through a display.

Other specific details of the present disclosure are included in the detailed description and drawings.

Advantageous Effects

The present disclosure can achieve one or more of the following effects.

First, it is possible to check an image of a guide point in real time without delay by receiving the image of the guide point from an image providing vehicle through 5G communication.

Second, it is possible to visually check traffic conditions of guide points through AR image information on the guide points and flexibly respond to the traffic conditions.

Third, it is possible to reduce data usage and provide a user-friendly navigation function by providing an AR image only for a guide point selected by a user.

Fourth, it is possible to provide safe and efficient composite guidance by dividing guide points into a first point and a second point and generating AR image information regarding each point.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

FIG. 1 is a diagram illustrating a vehicle navigation system according to an embodiment of the present disclosure.

FIG. 2 is a control block diagram of a vehicle according to an embodiment of the present disclosure.

FIG. 3 is a control block diagram of an electronic device according to an embodiment of the present disclosure.

FIG. 4 is a flowchart of an AR image provision method according to an embodiment of the present disclosure.

FIG. 5 is a diagram referenced to describe a guide point according to an embodiment of the present disclosure.

FIG. 6 is a diagram referenced to describe a search area according to an embodiment of the present disclosure.

FIG. 7 is a flowchart illustrating a candidate vehicle search step and an image providing vehicle selection step according to an embodiment of the present disclosure.

FIG. 8 is a diagram illustrating an image providing distance according to an embodiment of the present disclosure.

FIGS. 9 to 11b are diagrams referenced to describe a step of selecting an image providing vehicle according to priority according to an embodiment of the present disclosure.

FIG. 12 is a diagram referenced to describe a method of providing an AR image in a congested section according to an embodiment of the present disclosure.

FIG. 13 is a flowchart illustrating a step of generating AR image information according to an embodiment of the present disclosure.

FIGS. 14 and 15 are diagrams referenced to describe a calibration process according to an embodiment of the present disclosure.

FIG. 16 is a diagram illustrating a screen on which AR image information is displayed according to an embodiment of the present disclosure.

FIG. 17 is a diagram referenced to describe a composite guide section according to an embodiment of the present disclosure.

BEST MODE

Hereinafter, embodiments disclosed in the present specification will be described in detail with reference to the accompanying drawings, but the same or similar components are assigned the same reference numbers regardless of reference numerals, and redundant description thereof will be omitted. The suffixes "module" and "part" for components used in the following description are given only in consideration of the ease of writing the specification, and do not have distinct meanings or roles. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for ease of understanding of the embodiments disclosed in this specification, and the technical idea disclosed herein is not limited by the accompanying drawings. The embodiments and the accompanying drawing should be understood to include all changes, equivalents or substitutes included in the spirit and scope of the present disclosure.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

An element described in the singular form is intended to include a plurality of elements unless the context clearly indicates otherwise.

In addition, in the present application, it will be understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

FIG. 1 is a diagram illustrating a vehicle navigation system according to an embodiment of the present disclosure.

Referring to FIG. 1, a vehicle navigation system 1 according to an embodiment of the present disclosure may include at least one of a vehicle 10, an external server 20, and candidate vehicles 30. The vehicle 10 may transmit/receive information to/from the external server 20 or the candidate vehicles 30 through 5G communication. The external server 20 may transmit/receive information to/from the vehicle 10 or the candidate vehicles 30 through 5G communication. The candidate vehicles 30 may transmit/receive information to/from the vehicle 10 or the external server 20 through 5G communication.

The vehicle 10 is defined as a transportation means running on a road or a track. The vehicle 10 includes a car, a train, and a motorcycle. The vehicle 10 may include an internal combustion engine vehicle having an engine as a power source, a hybrid vehicle having an engine and an electric motor as power sources, and an electric vehicle having an electric motor as a power source. The vehicle 10 may be a shared vehicle. The vehicle 10 may be an autonomous vehicle.

The external server 20 may include a server that provides real-time image information. The external server 20 may include a server that provides augmented reality (AR) content. The external server 20 may include a server that provides real-time traffic information.

The external server 20 may receive information on a guide point and vehicle speed information from the vehicle 10. The external server 20 may search for the candidate vehicles 30 based on the information on the guide point and the vehicle speed information. The external server 20 may select an image providing vehicle from among the candidate vehicles 30 according to set priority.

The external server 20 may receive a camera image from the image providing vehicle. The external server 20 may generate a graphical object to be displayed on the received camera image using AR. The external server 20 may transmit AR image information including the camera image and the graphical object to the vehicle 10.

The candidate vehicles 30 may mean vehicles which have been verified within a search area set by the external server 20. The candidate vehicles 30 may include an image providing vehicle. The image providing vehicle may include a first image providing vehicle 40 or a second image providing vehicle 41 according to set priority. Hereinafter, in the present specification, an image providing vehicle that is not mentioned as the second image providing vehicle means the first image providing vehicle.

In the present disclosure, the vehicle 10 and the candidate vehicles 30 use a navigation application of the same map format. The vehicle 10 and the candidate vehicles 30 may periodically transmit current location information, link ID information on a map, driving direction information, or driving speed information to the external server 20. Location information may include GPS information of a vehicle matched with a map. According to an embodiment, the location information may include GPS information and link ID information. The link ID may mean an ID of a link constituting road data of a map. Driving direction information may mean a driving direction on a link.

FIG. 2 is a control block diagram of the vehicle according to an embodiment of the present disclosure.

Referring to FIG. 2, the vehicle 10 includes an electronic device 100, a user interface device 200, an object detection device 210, a communication device 220, a driving operation device 230, a main ECU 240, a vehicle driving device 250, a driving system 260, a sensing unit 270, and a location data generation device 280.

The electronic device 100 may mean an electronic device for performing a navigation operation. The electronic device 100 may mean an electronic device for displaying AR image information supplied from the external server 20 through the user interface device 200 during a navigation operation.

The user interface device 200 is a device for communication between the vehicle 10 and a user. The user interface device 200 may receive user input and provide information generated in the vehicle 10 to the user. The vehicle 10 may implement a user interface (UI) or a user experience (UX) through the user interface device 200.

The user interface device 200 may implement a UI for safely operating functions of the vehicle 10 by the electronic device 100.

The user interface device 200 may include an input unit and an output unit.

The input unit is used to receive information from a user, and data collected by the input unit may be processed as a control command of the user. The input unit may include an audio input unit, a gesture input unit, a touch input unit, and a mechanical input unit.

The output unit may include at least one of a display unit, an audio output unit, and a haptic output unit to generate an output related to visual, auditory, or tactile sense.

The display unit may display graphical objects corresponding to various types of information. The display unit may include at least one of a liquid crystal display (LCD), a thin film transistor-liquid crystal display (TFT LCD), an organic light-emitting diode (OLED), a flexible display, a 3D display and an e-ink display.

The display unit may implement a touchscreen by forming a layered structure with a touch input unit or being integrally formed therewith. The display unit may be implemented as a head up display (HUD). In this case, a projection module may be provided to output information through an image projected to a windshield or a window. The display unit may include a transparent display. The transparent display may be attached to a windshield or a window.

The display unit may be provided on an area of a steering wheel, an area of an instrument panel, an area of a seat, an area of each pillar, an area of a door, an area of a center console, an area of a head lining, and an area of a sun visor, or may be disposed or implemented in an area of a windshield or an area of a window.

Meanwhile, the user interface device 200 may include a plurality of display units.

The audio output unit converts an electrical signal provided from a processor 170 into an audio signal and outputs the audio signal. To this end, the audio output unit may include one or more speakers.

The haptic output unit generates a tactile output. For example, the haptic output unit may vibrate a steering wheel, a seat belt, or a seat such that the user can recognize an output.

Meanwhile, the user interface device 200 may be referred to as a vehicle display device.

The object detection device 210 may include at least one sensor capable of detecting an object outside the vehicle 10. The object detection device 210 may include at least one of a camera, a radar, a lidar, an ultrasonic sensor, and an infrared sensor. The object detection device 210 may provide data regarding an object generated based on a sensing signal generated by a sensor to at least one electronic device included in the vehicle.

Objects may be various objects related to the operation of the vehicle 10. For example, objects may include lanes, other vehicles, pedestrians, two-wheeled vehicles, traffic signals, lights, roads, structures, speed bumps, features, animals, and the like.

Meanwhile, objects may be classified into moving objects and fixed objects. For example, moving objects may include other vehicles and pedestrians, and fixed objects may include traffic signals, roads, and structures.

The camera may generate information on an object outside the vehicle 10 using images. The camera may include at least one lens, at least one image sensor, and at least one processor that is electrically connected to the image sensor to process a received signal and generate data about an object based on the processed signal.

The camera may be at least one of a mono camera, a stereo camera, and an around view monitoring (AVM) camera. The camera may obtain position information of an object, information on a distance from an object, or information on a relative speed with respect to an object using various image processing algorithms. For example, the camera may acquire information on a distance from an object and information on a relative speed with respect to the object from obtained images based on change in the size of the object over time.

For example, the camera may acquire information on a distance from an object and information on a relative speed with respect to the object through a pinhole model, road surface profiling, or the like.

For example, the camera may acquire distance information and relative speed information regarding an object based on disparity information in a stereo image obtained from a stereo camera.

The radar may generate information on an object outside the vehicle 10 using radio waves. The radar may include an electromagnetic wave transmitter, an electromagnetic wave receiver, and at least one processor that is electrically connected to the electromagnetic wave transmitter and the electromagnetic wave receiver, processes a received signal, and generates data regarding an object based on the processed signal.

The radar may employ a pulse radar method or a continuous wave radar method in terms of a radio wave emission principle. The radar may be implemented according to a frequency modulated continuous wave (FMCW) method or a frequency shift keyong (FSK) method according to a signal waveform in the continuous wave radar method. The radar may detect an object via electromagnetic waves based on a time of flight (TOF) method or a phase-shift method and detect the position of the detected object, the distance to the detected object, and a relative speed with respect to the detected object.

The lidar may generate information on an object outside the vehicle 10 using laser light. The lidar may include a light transmitter, a light receiver, and at least one processor that is electrically connected to the light transmitter and the light receiver, processes a received signal, and generates data regarding an object based on the processed signal.

The lidar may be implemented according to the time of flight (TOF) method or the phase-shift method. The lidar may be implemented as a driven or non-driven type. When the lidar is implemented as a driven type, it is rotated by a motor and may detect an object around the vehicle 10. When the lidar is implemented as a non-driven type, it may detect an object located within a predetermined range with respect to the vehicle by light steering.

The vehicle 10 may include a plurality of non-driven type lidars. The lidar may detect an object through laser light based on the time of flight (TOF) method or the phase-shift method, and detect the position of the detected object, the distance to the detected object, and a relative speed with respect to the detected object.

The communication device 220 may exchange signals with a device located outside the vehicle 10. The communication device 220 may exchange signals with at least one of infrastructure (e.g., a server and a broadcasting station) and other vehicles. The communication device 220 may include at least one of a transmit antenna, a receive antenna, a radio frequency (RF) circuit capable of implementing various communication protocols, and an RF element to perform communication.

The communication device 220 may include a short-range communication unit, a location information unit, a V2X communication unit, an optical communication unit, a broadcast transceiver, and an intelligent transport systems (ITS) communication unit.

The V2X communication unit is a unit for performing wireless communication with a server (V2I: Vehicle to Infra), another vehicle (V2V: Vehicle to Vehicle), or a pedestrian (V2P: Vehicle to Pedestrian). The V2X communication unit may include an RF circuit capable of implementing protocols for communication with infrastructure (V2I), vehicle-to-vehicle communication (V2V), and communication with pedestrians (V2P).

Meanwhile, the communication device 220 may implement a vehicle display device together with the user interface device 200. In this case, the vehicle display device may be referred to as a telematics device or an audio video navigation (AVN) device.

The communication device 220 may communicate with a device located outside the vehicle 10 using 5G (e.g., new radio (NR)). The communication device 220 may implement V2X (V2V, V2D, V2P, and V2N) communication using 5G.

The driving operation device 230 is a device for receiving user input for driving. In a manual mode, the vehicle 10 may be driven based on a signal provided by the driving operation device 230. The driving operation device 230 may include a steering input device (e.g., a steering wheel), an accelerator input device (e.g., an accelerator pedal), and a brake input device (e.g., a brake pedal).

The main ECU 240 may control the overall operation of at least one electronic device included in the vehicle 10.

The vehicle driving device 250 is a device for electrically controlling various driving devices in the vehicle 10. The vehicle driving device 250 may include a powertrain driving device, a chassis driving device, a door/window driving device, a safety device driving device, a lamp driving device, and an air conditioning driving device. The powertrain drive device may include a power source driving device and a transmission driving device. The chassis drive device may include a steering driving device, a brake driving device, and a suspension driving device.

The vehicle driving device 250 may be referred to as a control electronic control unit (ECU).

The driving system 260 may generate a signal for controlling the movement of the vehicle 10 or outputting information to the user based on data regarding an object received from the object detection device 210. The driving system 260 may provide the generated signal to at least one of the user interface device 200, the main ECU 240, and the vehicle driving device 250.

The driving system 260 may include an ADAS. The ADAS 260 may implement at least one of an adaptive cruise control (ACC) system, an automatic emergency braking (AEB) system, a forward collision warning (FCW) system, a lane keeping assist (LKA) system, a lane change assist (LCA) system, a target following assist (TFA) system, a blind spot detection (BSD) system, an adaptive high beam assist (HBA) control system, an auto parking system (APS), a pedestrian collision warning system, a traffic sign recognition (TSR) system, a traffic sign assist (TSA) system, a night vision (NV) system, a driver status monitoring (DSM) system, and a traffic jam assist (TJA) system.

The driving system 260 may include an autonomous driving electronic control unit (ECU). The autonomous driving ECU may set an autonomous driving route based on data received from at least one of other electronic devices in the vehicle 10. The autonomous driving ECU may set an autonomous driving route based on data received from at least one of the user interface device 200, the object detection device 210, the communication device 220, the sensing unit 270, and the location data generation device 280. The autonomous driving ECU may generate a control signal to cause the vehicle 10 to travel along the autonomous driving path. The control signal generated by the autonomous driving ECU may be provided to at least one of the main ECU 240 and the vehicle driving device 250.

The sensing unit 270 may sense the state of the vehicle. The sensing unit 270 may include at least one of an inertial navigation unit (IMU) sensor, a collision sensor, a wheel sensor, a speed sensor, an inclination sensor, a weight sensor, a heading sensor, a position module, a vehicle forward/reverse movement sensor, a battery sensor, a fuel sensor, a tire sensor, a steering sensor according to steering wheel rotation, a vehicle interior temperature sensor, a vehicle interior humidity sensor, an ultrasonic sensor, an illuminance sensor, an accelerator pedal position sensor, and a brake pedal position sensor. Meanwhile, the inertial navigation unit (IMU) sensor may include at least one of an acceleration sensor, a gyro sensor, and a magnetic sensor.

The sensing unit 270 may generate status data of the vehicle based on a signal generated by at least one sensor. The sensing unit 270 may obtain sensing signals with respect to vehicle posture information, vehicle motion information, vehicle yaw information, vehicle roll information, vehicle pitch information, vehicle collision information, vehicle direction information, vehicle angle information, vehicle speed information, vehicle acceleration information, vehicle inclination information, vehicle forward/reverse movement information, battery information, fuel information, tire information, vehicle lamp information, vehicle interior temperature information, vehicle interior humidity information, a steering wheel rotation angle, external illuminance of the vehicle, a pressure applied to the accelerator pedal, a pressure applied to the brake pedal, and the like.

In addition, the sensing unit 270 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), and the like.

The sensing unit 270 may generate vehicle status information based on sensed data. The vehicle status information may be information generated based on data sensed by various sensors provided in the vehicle.

For example, vehicle status information may include vehicle posture information, vehicle speed information, vehicle inclination information, vehicle weight information, vehicle direction information, vehicle battery information, vehicle fuel information, vehicle tire pressure information, vehicle steering information, vehicle interior temperature information, vehicle interior humidity information, pedal position information, and vehicle engine temperature information.

Meanwhile, the sensing unit may include a tension sensor. The tension sensor may generate a sensing signal based on a tension state of a seat belt.

The location data generation device 280 may generate location data of the vehicle 10. The location data generation device 280 may include at least one of a global positioning system (GPS) and a differential global positioning system (DGPS). The location data generation device 280 may generate location data of the vehicle 10 based on a signal generated from at least one of the GPS and the DGPS. According to an embodiment, the location data generation device 280 may correct location data based on at least one of an inertial measurement unit (IMU) of the sensing unit 270 and a camera of the object detection device 210.

The location data generation device 280 may be referred to as a location positioning device. The location data generation device 280 may be referred to as a global navigation satellite system (GNSS).

The vehicle 10 may include an internal communication system 50. A plurality of electronic devices included in the vehicle 10 may exchange signals via the internal communication system 50. A signal may include data. The internal communication system 50 may use at least one communication protocol (e.g., CAN, LIN, FlexRay, MOST, or Ethernet).

FIG. 3 is a control block diagram of an electronic device according to an embodiment of the present disclosure.

Referring to FIG. 3, the electronic device 100 may include a memory 140, a processor 170, an interface unit 180, and a power supply unit 190.

The memory 140 is electrically connected to the processor 170. The memory 140 may store basic data for a unit, control data for operation control of the unit, and input/output data. The memory 140 may store data processed by the processor 170. The memory 140 may be configured as at least one of a ROM, a RAM, an EPROM, a flash drive, and a hard drive in terms of hardware. The memory 140 may store various types of data for the overall operation of the electronic device 100, such as a program for processing or control of the processor 170. The memory 140 may be implemented integrally with the processor 170. According to an embodiment, the memory 140 may be classified as a sub-component of the processor 170.

The interface unit 180 may exchange signals with at least one electronic device provided in the vehicle 10 in a wired or wireless manner. The interface unit 180 may exchange signals with at least one of the object detection device 210, the communication device 220, the driving operation device 230, the main ECU 240, the vehicle driving device 250, the ADAS 260, the sensing unit 270, and the location data generation device 280 in a wired or wireless manner. The interface unit 180 may be configured as at least one of a communication module, a terminal, a pin, a cable, a port, a circuit, an element, and a device.

The interface unit 180 may receive data from an external server or an external device, or transmit data in the interface device 100 to an external server or an external device. In this case, the interface unit 180 may acquire data by communicating with an external server having an authenticated database.

The interface unit 180 may include a port for connecting a device equipped with an identification module. The identification module may include a chip storing various types of information for certificating permission to use the interface device 100.

The interface unit 180 may receive location data of the vehicle 10 from the location data generation device 280. The interface unit 180 may receive driving speed data from the sensing unit 270. The interface unit 180 may receive data regarding an object around the vehicle from the object detection device 210.

The power supply unit 190 may supply power to the electronic device 100. The power supply unit 190 may receive power from a power source (e.g., a battery) included in the vehicle 10 and supply power to each unit of the electronic device 100. The power supply unit 190 may be operated according to a control signal provided from the main ECU 240. The power supply unit 190 may be implemented as a switched-mode power supply (SMPS).

The processor 170 may be electrically connected to the memory 140, the interface unit 180, and the power supply unit 190 to exchange signals. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controller, microcontrollers, microprocessors, and other electrical units for executing functions.

The processor 170 may be driven by power provided from the power supply unit 190. The processor 170 may receive data, process the data, generate a signal, and provide the signal while power is supplied from the power supply unit 190.

The processor 170 may receive information from another electronic device in the vehicle 10 through the interface unit 180. The processor 170 may provide a control signal to another electronic device in the vehicle 10 through the interface unit 180.

The processor 170 may receive a signal input by the user through the user interface device. For example, the processor 170 may receive at least one of voice input, gesture input, touch input, and mechanical input through the user interface device 200.

The processor 170 may select a guide point based on a selection signal input by the user. The guide point may be located on a driving route of the vehicle 10 guided by the navigation system. The guide point may include a point requiring turn guidance, such as an intersection, an entry point or an exit point of a ramp section, or a junction.

The processor 170 may transmit information on a guide point to the external server 20. The information on the guide point may include location information of the guide point and link information before entering the guide point along a driving route guided by the navigation system. The location information of the guide point may include GPS information of the guide point. The link information may include at least one of link ID information, link length information, and driving direction information for a link.

The processor 170 may transmit current speed information of the vehicle 10 to the external server 20. The sensing unit 270 may generate current speed information of the vehicle 10. The processor 170 may transmit the current speed information of the vehicle 10 generated by the sensing unit 270 to the external server 20 through the communication device 220.

The processor 170 may set priority based on a selection signal input by the user. The criterion of the priority may include a vehicle that is a relatively short distance from a guide point or a vehicle that is a relatively long distance from the guide point within an image providing area.

The processor 170 may receive AR image information about a guide point from the external server 20. The AR image information may include a calibrated camera image and a graphical object. The processor 170 may transmit a stored calibration result value to the external server 20. The external server 20 may perform calibration of a camera image based on the calibration result value received from the processor 170. The external server 20 may generate a graphical object to be displayed on a calibrated camera image.

The processor 170 may display the AR image information about the guide point on a navigation screen. The processor 170 may display the AR image information in which the graphical object is superimposed on the camera image on an area of the navigation screen.

Guide points may include a first point and a second point. AR image information may include first AR image information on the first point and second AR image information on the second point. In this case, the processor 170 may display the first AR image information and the second AR image information until the vehicle 10 passes through the first point. Further, when the vehicle 10 has passed through the first point, the processor 170 may display the first AR image information and may not display the second AR image information until the vehicle 10 passes through the second point.

The electronic device 100 may include at least one printed circuit board (PCB). The memory 140, the interface unit 180, the power supply unit 190, and the processor 170 may be electrically connected to the printed circuit board.

Hereinafter, the operation of the vehicle 10 may also be described as the operation of the electronic device 100 or the operation of the processor 170.

FIG. 4 is a flowchart of an AR image provision method according to an embodiment of the present disclosure.

Referring to FIG. 4, the vehicle 10, the external server 20, and the image providing vehicle 40 may provide an AR image by transmitting and receiving information therebetween. Finally, the vehicle 10 may provide the AR image through the navigation screen. In the present disclosure, the AR image refers to an image in which AR content including a driving route of the host vehicle is displayed on an image of guide points captured by another vehicle using augmented reality.

The AR image provision method of a vehicle navigation system includes a route setting and guidance step S400, a guide point selection step S405, a data transmission step S410, a candidate vehicle search step S415, an image providing vehicle selection step S420, a camera image request and transmission step, an AR image information generation step S435, an AR image information transmission step S440, and a navigation screen display step S445.

The route setting and guidance step S400 may include a step in which a designation is input to the vehicle 10 through a user input signal and the navigation system sets a route to the destination and provides guidance.

The guide point selection step S405 may include a step in which the vehicle 10 selects guide points according to a selection signal input by the user. The guide points may be present on the route guided by the navigation system. The guide points may include points requiring turn guidance, such as an intersection, an entry point or an exit point of a ramp section, and a junction.

The data transmission step S410 may include a step in which the vehicle 10 transmits data for generating AR image information to the external server 20. The data transmitted by the vehicle 10 may include at least one of information on guide points, current location information of the vehicle 10, and current speed information of the vehicle 10. In addition, the data transmitted by the vehicle 10 may include calibration result values stored in the vehicle 10.

The information on the guide points may include location information of the guide points and link information before entering the guide points along the driving route guided by the navigation system. The location information of the guide points may include GPS information of the guide points. The link information may include at least one of link ID information, link length information, and driving direction information for a link.

The candidate vehicle search step S415 may include a step in which the external server 20 sets a search area based on the information on the guide points or the vehicle speed information received from the vehicle 10 and searches the candidate vehicles 30 within the search area. The candidate vehicles 30 may refer to vehicles that have been verified among vehicles predicted to pass through the guide points. Detailed description will be given later with reference to FIG. 7.

The image providing vehicle selection step S420 may include a step in which the external server 20 selects the image providing vehicle 40 which will provide images from among the candidate vehicles according to preset priority. The priority may be set by the vehicle 10 based on a selection signal of the user. The criterion of the priority may include a vehicle that is a relatively short distance from the guide points or a vehicle that is a relatively long distance from the guide points within an image providing area. Detailed description will be given later with reference to FIG. 7.

The camera image request and transmission step may include a step in which the external server 20 requests a camera image from the image providing vehicle 40 (S425), and the image providing vehicle 40 transmits the camera image to the external server 20 (S430). The camera image may include an image captured by a camera mounted on the image providing vehicle 40. The camera image may include an image captured by a camera mounted on a mobile terminal positioned inside the image providing vehicle 40. In this case, the mobile terminal may use a navigation application using the same map format as that of the vehicle navigation system.

The image providing vehicle 40 may provide a camera image when entering a first area and end provision of the camera image upon passing through a guide point. The first area is an image providing area and may vary depending on a road type or a traffic condition. Detailed description of the first area will be given later with reference to FIG. 8.

When image provision of the image providing vehicle 40 is finished, the external server 20 may select the second image providing vehicle 41 from among the candidate vehicles 30 according to the priority. The external server 20 may re-verify the second image providing vehicle 41 according to a stored protocol. The external server 20 may re-verify the second image providing vehicle 41 by checking whether the second image providing vehicle 41 passes through a guide point. Re-verification may be performed by the stored protocol.

When the second image providing vehicle 41 enters the first area after re-verification is completed, the second image providing vehicle 41 may provide a camera image to the external server 20.

The AR image information generation step S435 may include a step in which the external server 20 performs calibration of camera images based on calibration result values received from the vehicle 10. The calibration result values may include calibration parameters of a built-in camera and a projection matrix stored in the vehicle 10.

The external server 20 may receive a camera image from the image providing vehicle 40 and may perform calibration of the camera image based on the calibration result values. The external server 20 may generate a graphical object to be displayed on the calibrated camera image. The graphical object may include at least one of a carpet for guiding a driving route of the host vehicle, turn by turn (TBT), driving guidance information, and a bar indicating a remaining distance to a guide point.

The TBT may be an arrow image indicating a driving route. For example, the TBT may be a left, right, straight forward or U-turn arrow image indicating a driving route at an intersection or a junction. The TBT may be displayed from when the vehicle 10 is located within a preset distance from an intersection or a junction. The external server 20 may generate TBT information to be displayed on the calibrated camera image.

The driving guidance information includes at least one of current driving lane information, traveling direction information, destination lane information, information on a distance to a destination, and TBT information. The driving guidance information may be displayed separately from a camera image provided by the image providing vehicle 40.

The bar indicating a remaining distance to a guide point may be an image representing the remaining distance between the image providing vehicle 40 and the guide point in the form of a bar. The remaining distance indication bar may decrease after the image providing vehicle 40 provides an image and may disappear upon arrival at the guide point.

The AR image information transmission step S440 may mean a step in which the external server 20 transmits AR image information to the vehicle 10. The AR image information may include a calibrated camera image and a graphical object.

The navigation screen display step S445 may include a step in which the vehicle 10 receives AR image information about guide points including a camera image and a graphical object from the external server 20 and a step in which the vehicle 10 displays the AR image information in which the graphical object is superimposed on the camera image on an area of the navigation screen.

FIG. 5 is a diagram referenced to describe a guide point according to an embodiment of the present disclosure.

Referring to FIG. 5, a plurality of guide points may be present on a driving route to a destination. The guide points may refer to points requiring turn guidance, such as an intersection, an entry point or an exit point of a ramp section, or a junction.

The guide points may include a first guide point 500 or a second guide point 501. The user may select any one of the first guide point 500 and the second guide point 501. When the user selects a guide point, the vehicle 10 may transmit information on the guide point to the external server 20.

The information on the guide point may include location information or link information of the guide point. The link information may refer to link information before entering the guide point along a driving route guided by the navigation system. The link information may include at least one of link ID information, link length information, and driving direction information for a link. The location information of the guide point may include GPS information of the guide point.

For example, information on the first guide point 500 may be provided as shown in Table 1, and information on the second guide point 501 may be provided as shown in Table 2. Information on a guide point may be obtained from map data stored in the navigation application. When the user selects the first guide point 500 or the second guide point 501, the vehicle 10 may transmit the information of Table 1 or Table 2 to the external server 20.

TABLE 1

| Information | Value |
|---|---|
| Location | (37.489530, 127.031624) |
| Link ID | [10002, 10001] |
| Distance | [54 m, 64 m] |
| Direction | [Forward direction, Forward direction] |

TABLE 2

| Information | Value |
|---|---|
| Location | (37.490592, 127.035022) |
| Link ID | [10501, 10502] |
| Distance | [75 m, 27 m] |
| Direction | [Reverse direction, Reverse direction] |

FIG. 6 is a diagram referenced to describe a search area according to an embodiment of the present disclosure.

Referring to FIG. 6, a search area 700 may include a first area 600 and a second area. In the embodiment shown in FIG. 6, the guide point 500 has been selected by the user and is an intersection.

The first area 600 may be set in a direction in which the vehicle 10 is located based on the guide point 500. The first area 600 may vary according to a road type or a traffic condition. The first area 600 may be proportional to an image providing distance S. The image providing distance S may be calculated as the product of a legal speed limit L of the road to which the first region 600 belongs and an image providing time T.

The second area may be set in a direction in which the vehicle 10 is located based on the end point of the first area 600. The second area may be proportional to an additional movement distance D. The additional moving distance D may be calculated as the product of the legal speed limit L of the road to which the first area 600 belongs and a time I required for the external server 20 to search for the candidate vehicles 30. When a candidate vehicle is not selected in the search area 700, the external server 20 may extend the second area and search for a candidate vehicle.

The search area 700 may include the first area 600 and the second area. The search area 700 may be proportional to a search distance C. The search distance C may be calculated as the sum of the image providing distance S and the additional movement distance D.

The external server 20 may set the search area 700 and detect other vehicles located in the search area 700. The external server 20 may periodically receive location information and speed information from other vehicles using the same navigation application. The location information may include at least one of GPS information and link information.

The external server 20 may detect other vehicles located in the search area at a time when a candidate vehicle search request is received, based on location information and speed information periodically transmitted from the other vehicle. For example, if the external server 20 receives location information and speed information of another vehicle at time t and receives a candidate vehicle search request from the vehicle 10 at time t+1, the external server 20 may calculate the location of the other vehicle at time t+1 and determine whether the other vehicle belongs to the search area.

Referring to FIG. 6, it is predicted that one vehicle will be located in the search area 700 at time t+1, and the vehicle may be selected as a candidate vehicle 30 upon verification. Since there is only one candidate vehicle 30, this vehicle can be automatically selected as an image providing vehicle 40. The image providing vehicle 40 may transmit a camera image captured by a camera mounted thereon to the external server 20 while entering the first area 600.

FIG. 7 is a flowchart illustrating the candidate vehicle search step and the image providing vehicle selection step according to an embodiment of the present disclosure.

Referring to FIG. 7, the candidate vehicle search step S415 may include a first area setting step S700, a second area setting step S705, a step S710 of predicting another vehicle located in a search area, a step S715 of determining whether there are one or more other vehicles, a step S720 of extending the search area, a verification step S725, and a candidate vehicle selection step S730.

In addition, the image providing vehicle selection step S420 may include a step S735 of determining whether there are multiple candidate vehicles, a step S740 of selecting an image providing vehicle 40 according to priority, and a step S745 of selecting the selected candidate vehicle as the image providing vehicle 40.

The first area setting step S700 may include a step in which the external server 20 sets a first area in which an image is provided based on guide points. The first area may be set in a direction in which the vehicle 10 is located based on the guide points. The first area may vary according to road type or traffic condition.

The first area may be proportional to the image providing distance S. The image providing distance S may be calculated as the product of the legal speed limit L of the road to which the first area belongs and the image providing time T.

The second area setting step S705 may include a step in which the external server 20 sets a second area, which is a preset additional area, based on the end point of the first area. The second area may be set in a direction in which the vehicle 10 is located based on the first area.

The second area may be proportional to the additional movement distance D. The additional moving distance D may be calculated as the product of the legal speed limit L of the road to which the first area belongs and the time I required for the external server 20 to search for candidate vehicles 30.

The step S710 of predicting other vehicle located in the search area may include a step of setting a search area including the first area and the second area and a step of predicting other vehicle located in the search area. The search area may be calculated as the sum of the first area and the second area. The step of predicting other vehicle may include a step in which the external server 20 predicts other vehicles located in the search area at a time when a candidate vehicle search request is received based on location information and speed information of other vehicles that are periodically transmitted to the external server 20.

The step S715 of determining whether there are one or more other vehicles may include a step of determining whether there are one or more other vehicles located in the search area. The external server 20 may extend the search area when no other vehicles are detected. When one or more other vehicles are detected, the external server 20 may proceed to the verification step S725.

The step S720 of extending the search area may include a step of extending the search area based on guide points when no other vehicles are detected in step S715. Since the first area is determined by a road type or a traffic condition and the second area is an additional area, extension of the search area may mean extension of the second area. The external server 20 may extend the search area and repeatedly determine whether one or more other vehicles are present within the search area.

The verification step S725 may include a step of checking whether each of other vehicles passes through a guide point when one or more other vehicles are detected in step S715. When it is predicted that another vehicle will be located in the search area, the external server 20 may verify whether the other vehicle will pass through the guide point through a stored protocol.

The external server 20 may perform verification on each of the other vehicles predicted to be located in the search area and delete other vehicles verified as not passing through the guide point from a list without including the other vehicles in candidate vehicles.

The candidate vehicle selection step S730 may include a step of selecting other vehicles that have been verified as passing through the guide point through the verification step S725 as candidate vehicles. The external server 20 may extend the search area when there are no other vehicles that have been verified as passing through the guide point.

The step S735 of determining whether there are multiple candidate vehicles may include a step of determining the number of candidate vehicles in the search area. When there is a single candidate vehicle, the external server 20 may select the candidate vehicle as an image providing vehicle 40. When the number of candidate vehicles is plural, the external server 20 may select an image providing vehicle 40 according to priority.

The step S740 of selecting an image providing vehicle 40 according to priority may include a step in which the external server 20 selects a first image providing vehicle 40 according to the criterion of priority. The criterion of priority may be selected by the vehicle 10 or the processor 170. The criterion of priority may include a vehicle (first criterion) that is a relatively short distance from a guide point or a vehicle (second criterion) that is a relatively long distance from the guide point within the first area.

The vehicle 10 or the processor 170 may select one of the first criterion and the second criterion according to a selection signal input by the user. The vehicle 10 or the processor 170 may transmit information about the selected criterion of priority to the external server 20. The external server 20 may select the first image providing vehicle 40 of the first priority, a second image providing vehicle 41 of the second priority, and a third image providing vehicle 42 of the third priority according to the selected criterion of priority.

When the second image providing vehicle 41 or the third image providing vehicle 42 is selected, the external server 20 may re-verify whether the second image providing vehicle 41 or the third image providing vehicle 42 passes through the guide point. Re-verification may include a step of checking whether a lower priority vehicle according to priority passes through the guide point according to a stored protocol.

When the second image providing vehicle 41 has been re-verified as passing through the guide point, the external server 20 may receive a camera image when the second image providing vehicle 41 enters the first area. When the third image providing vehicle 42 has been re-verified as passing through the guide point, the external server 20 may receive a camera image when the third image providing vehicle 42 enters the first area.

The step S745 of selecting a selected candidate vehicle as an image providing vehicle 40 may mean a step of selecting the candidate vehicle as the image providing vehicle 40 when there is a single candidate vehicle. The external server 20 may select one candidate vehicle as the image providing vehicle 40 and request a camera image from the image providing vehicle 40.

FIG. 8 is a diagram illustrating an image providing distance according to an embodiment of the present disclosure.

Referring to FIG. 8, an image providing distance may be 100 m (801), 200 m (802), or 500 m (803). The image providing distance may vary according to road type, traffic conditions or user settings.

The image providing distance may vary according to road type or traffic condition. The road type may be determined by map data stored in the application, and the traffic condition may be determined through communication with a traffic information server.

The image providing distance is a factor that determines an image providing area and may mean a distance at which an image providing vehicle provides a camera image. The image providing distance may be calculated as the product of an image providing time and the legal speed limit of the road to which the first area belongs.

The image providing distance may be determined according to road type. The road type may include a general road, an exclusive road for automobiles, and a highway. Further, the road type may include a one-way road with one lane and a road with two or more lanes.

The processor 170 may set the image providing distance or the image providing time. For example, if the legal speed limit on a one-lane general road is 60 km/h and the image providing distance is set to 100 m, the image providing time may be calculated as 6 seconds. In addition, if the legal speed limit on a one-way two-lane highway is 100 km/h, and the image providing distance is set to 1 km, the image providing time may be calculated as 36 seconds.

The image providing distance may be determined according to traffic conditions. Traffic conditions can be divided into smooth, slow, delayed and congested. When determining the image providing distance according to traffic condition, the external server 20 may adjust a weight according to traffic condition and a legal speed limit. That is, the external server 20 may determine the image providing area based on the weight according to the legal speed limit and traffic condition.

For example, the legal speed limit can be changed by calculating the weight as 100% if the traffic condition is smooth, as 70% if the traffic condition is slow, as 50% if the traffic condition is delayed, and as 30% if the traffic condition is congested. When the traffic condition is delayed on a road where the legal speed limit on a highway basis is 100 km/h, the legal speed limit for calculating the image providing distance may be 50 km/h by calculating a weight of 50%. In this case, if the processor 170 sets the image providing time to 36 seconds, the image providing distance may be calculated as 500 m.

In addition, when the traffic situation is congested on a road where the legal speed limit on a highway basis is 100 km/h, the legal speed limit for calculating the image providing distance may be 30 km/h by calculating a weight of 30%. In this case, if the processor 170 sets the image providing time to 36 seconds, the image providing distance may be calculated as 300 m.

FIGS. 9 to 11*b* are diagrams referenced to describe the image providing vehicle selection step according to priority according to an embodiment of the present disclosure.

When the number of verified candidate vehicles is plural, the external server 20 may select an image providing vehicle 40 according to priority. The external server 20 may select a first image providing vehicle 40 according to the criterion of priority. The criterion of priority may be selected by the vehicle 10 or the processor 170. The criterion of priority may be determined by a selection signal input by a user.

The criterion of priority may include a vehicle (first criterion) that is a relatively short distance from a guide point or a vehicle (second criterion) that is a relatively long distance from the guide point within a first area.

The first criterion has an advantage in that the guide point can be identified at a closer distance through a camera image provided by the image providing vehicle 40. However, the first criterion has a disadvantage in that the length of the camera image is short because the image providing vehicle 40 is located at a point close to the guide point. That is, according to the first criterion, it is necessary to receive camera images from a plurality of image providing vehicles 40 until the vehicle 10 arrives at the guide point.

FIG. 9 illustrates a method in which an image providing vehicle is selected when the first criterion is selected as the criterion of priority. The external server 20 may select a first priority vehicle A according to the first criterion in the first area 600 as a first image providing vehicle 40. When the first image providing vehicle 40 has passed through a guide point, the external server 20 may select a second priority vehicle B according to the first criterion as a second image providing vehicle 41. When the second image providing vehicle 41 has passed through the guide point, the external server 20 may select a third priority vehicle C according to the first criterion as a third image providing vehicle 42.

Referring to FIG. 11a, in the method of selecting an image providing vehicle according to the first criterion, a camera image at a position close to the guide point 500 can be provided and the situation of the guide point 300 can be rapidly determined, but a plurality of image providing vehicles needs to be selected.

The second criterion has a disadvantage in that a guide point is identified from a long distance through a camera image provided by the image providing vehicle 40. However, since the image providing vehicle 40 is located at a point far from the guide point, the second criterion has an advantage in that the length of the camera image is long. That is, according to the second criterion, camera images can be provided from a small number of image providing vehicles 40 until the vehicle 10 arrives at the guide point.

FIG. 10 illustrates a method in which an image providing vehicle is selected when the second criterion is selected as the criterion of priority. The external server 20 may select the first priority vehicle A according to the second criterion in the first area 600 as the first image providing vehicle 40. When the first image providing vehicle 40 has passed through the guide point, the external server 20 may select the second priority vehicle E according to the second criterion as the second image providing vehicle 41. When the second image providing vehicle 41 has passed through the guide point, the external server 20 may select the third priority vehicle I according to the second criterion as the third image providing vehicle 42.

Referring to FIG. 11b, in the method of selecting an image providing vehicle according to the second criterion, it is difficult to rapidly determine the situation for the guiding point 500 by receiving a camera image from a location far from the guiding point 500, but long camera images from a small number of image providing vehicles can be provided.

The vehicle 10 or the processor 170 may select one of the first reference and the second reference according to the selection signal input by the user. The vehicle 10 or the processor 170 may transmit information on the selected criterion of priority to the external server 20. The external server 20 may select the first image providing vehicle 40 of the first priority, the second image providing vehicle 41 of the second priority, and the third image providing vehicle 42 of the third priority according to the selected criterion of priority.

FIG. 12 is a diagram referenced to describe a method of providing an AR image in a congested section according to an embodiment of the present disclosure.

Referring to FIG. 12, the external server 20 may determine whether a section around a guide point is a congested section 1201 through a camera image. The section around the guide point may mean a certain section set in a direction in which the vehicle 10 is located based on the guide point.

If the number of candidate vehicles in a camera image received from an image providing vehicle in the first area 600 is equal to or greater than a preset number, the external server 20 may determine the section around the guide point as the congested section 1201. Alternatively, the external server 20 may determine the section around the guide point as the congested section 1201 through communication with a traffic guide server. For example, when the average speed of the vehicle is 10 km/h in the section around the guide point, the section may be determined as the congested section 1201.

Upon determining that the section around the guide point is the congested section 1201, the external server 20 can calculate the length of the congestion section 1201 while searching in the reverse direction from the guide point through camera images. In this case, the external server 20 may receive an instantaneously captured image from each vehicle in the congested section 1201. The external server 20 may generate a camera image by connecting instantaneously captured images. The external server 20 may provide the camera image generated by connecting the instantaneously captured images to the vehicle 10.

The external server 20 may calculate the length of the congested section 1201 through the camera image and determine a starting point of the congested section 1201. The external server 20 may reset a search area based on the starting point of the congested section 1201.

The resetting of the search area may include resetting a first area 1202 and a second area 1203 in a direction in which the vehicle 10 is located based on the starting point of the congested section. The method of resetting the first area 1202 and the method of resetting the second area 1203 may be the same as steps S700 and S705 of FIG. 7.

The external server 20 may use a camera image obtained by connecting instantaneously captured images in the congested section 1201 in an emergency situation. When an emergency vehicle passes through the congested section 1201, a camera image obtained by connecting instantaneously captured images may be received from the external server 20. The external server 20 may detect an empty space in which the emergency vehicle will be located within the congested section through the camera image. The external server 20 may transmit information on the empty space and a driving route generated based on the information to the emergency vehicle. The external server 20 may transmit information on the emergency vehicle and the information on the empty space to vehicles in the congested section 1201 such that the emergency vehicle can efficiently pass through the congested section 1201.

FIG. 13 is a flowchart of the AR image information generation step according to an embodiment of the present disclosure.

Referring to FIG. 13, the AR image information generation step S435 may include a step S1301 of receiving first calibration parameter values, a step S1302 of calculating second calibration parameter values, a comparison step S1303, a step S1304 of deriving a projection matrix, and a step S1305 of generating a graphical object.

The step S1301 of receiving the first calibration parameter values may include a step in which the external server 20 receives calibration parameter values stored in the vehicle 10.

Referring to FIG. 14, the first calibration parameter values 1310 are parameter values necessary to perform calibration and may be generated by the processor 170 based on a virtual reference line in an image captured by a camera mounted in the vehicle 10.

The virtual reference line may include a vanishing line 1301. The virtual reference line may further include at least one of a bonnet line 1302 and a center line 1303. The vanishing line 1301 may refer to a virtual line formed in the horizontal direction based on a vanishing point in an image captured by a camera mounted in the vehicle 10. The bonnet line 1302 may refer to a virtual line formed in the horizontal direction based on the upper end of the bonnet of the vehicle 10 in the image captured by the camera mounted in the vehicle 10. The center line 1303 may refer to a virtual line formed in the vertical direction based on the center of the full width of the vehicle 10 in the image captured by the camera mounted in the vehicle 10.

The first calibration parameter values 1310 may include roll, pitch, yaw, X, Y, and Z parameters.

The step S1302 of calculating the second calibration parameter value s may include a step in which the external server 20 calculates the second calibration parameter values 1410 of the camera image based on the first calibration parameter value s 1310.

Referring to FIG. 15, the second calibration parameter values 1410 are parameter values necessary to perform calibration and may be generated by the external server 20 based on a virtual reference line in a camera image received from an image providing vehicle 40.

The external server 20 may calculate the second calibration parameter values 1410 based on at least one of a vanishing line (V') 1401, a bonnet line (B') 1402, and a center line (C') 1403 that are virtual reference lines of the image providing vehicle 40. The vanishing line 1401 may refer to a virtual line formed in the horizontal direction based on a vanishing point in an image captured by a camera mounted in the image providing vehicle 40. The bonnet line 1402 may refer to a virtual line formed in the horizontal direction based on the upper end of the bonnet of the image providing vehicle 40 in the image captured by the camera mounted in the image providing vehicle 40. The center line 1403 may refer to a virtual line formed in the vertical direction based on the center of the full width of the image providing vehicle 40 in the image captured by the camera mounted in the image providing vehicle 40.

The second calibration parameter values 1410 may include roll, pitch, yaw, X, Y, and Z parameters.

The comparison step S1303 and the projection matrix derivation step S1304 may include a step in which the external server 20 compares the second calibration parameter values 1410 of the camera image based on the first calibration parameter value 1310 and derives a projection matrix.

Referring to FIG. 15, the second calibration parameter values 1410 may be calculated by performing addition or subtraction based on the first calibration parameter values 1310. The external server 20 may derive the second calibration parameter values 1410 and a projection matrix that is a coordinate system conversion matrix based on the first calibration parameter values 1310.

The projection matrix may be defined as a coordinate system conversion matrix for a camera mounted in the vehicle 10 based on the first calibration parameter values 1310 and the second calibration parameter values 1410. The external server 20 may derive the projection matrix and transmit a calibration result value including the projection matrix to the vehicle 10.

The step S1304 of generating a graphical object may include a step in which the external server 20 generates a graphical object to be displayed on a calibrated camera image.

The graphical object may include at least one of a carpet for guiding a driving route of the vehicle 10, turn by turn (TBT), and a bar indicating a remaining distance to a guide point. The graphical object may further include an image for displaying driving guidance information.

FIG. 16 is a diagram illustrating a screen on which AR image information is displayed according to an embodiment of the present disclosure.

Referring to FIG. 16, AR image information displayed on the navigation system of the vehicle 10 may include at least one of a carpet 1501, TBT 1502, a remaining distance indication bar 1503, and driving guidance information 1504.

The carpet 1501 may refer to an image indicating a driving route of the vehicle 10. The carpet 1501 may mean a driving route to a destination guided by the navigation system of the vehicle 10. The external server 20 may display the driving route of the vehicle 10 on a camera image of the image providing vehicle 40 through the carpet 1501.

The TBT 1502 may refer to an arrow image indicating a driving route. For example, the TBT 1502 may be a left, right, straight forward or U-turn arrow image indicating a driving route at an intersection or a junction. The TBT 1502 may be displayed from when the vehicle 10 is located within a preset distance from an intersection or a junction. The external server 20 may generate TBT information to be displayed on a calibrated camera image.

The bar 1503 indicating a remaining distance to a guide point may be an image representing the remaining distance between the image providing vehicle 40 and the guide point in the form of a bar. The remaining distance indication bar 1503 may decrease after the image providing vehicle 40 provides an image and may disappear upon arrival at the guide point.

The driving guidance information 1504 includes at least one of current driving lane information, traveling direction information, target lane information, information on a distance to a destination, and TBT information. The driving guidance information 1504 may be displayed separately from a camera image provided by the image providing vehicle 40.

The vehicle 10 may receive AR image information on a guide point including a camera image and a graphical object from the external server 20. The vehicle 10 may display the AR image information in which the graphical object superimposed on the camera image on an area of the navigation screen. The vehicle 10 may receive camera images from a plurality of image providing vehicles and display the camera images on the navigation screen.

FIG. 17 is a diagram referenced to describe a composite guide point according to an embodiment of the present disclosure.

Referring to FIG. 17, the vehicle 10 may display first AR image information 1610 and second AR image information 1620 at compo site guide points. A composite guide point may mean a point that requires two or more turn guides within a predetermined distance based on a guide point selected by the user. The external server 20 may determine whether the guide point selected by the user is a point that requires a plurality of turn guides based on the guide point selected by the user.

The external server 20 may obtain information on the guide point from map data stored in the navigation application. The external server 20 may determine whether the guide point selected by the user is a composite guide point from the map data. The external server 20 may determine the guide point as a composite guide point if AR image information on the guide point selected by the user includes a plurality of TBTs.

For example, the external server 20 may determine the guide point as a composite guide point when route guidance at the guide point selected by the user is "turn left 50 m ahead after turning right".

Upon determining that the guide point selected by the user is a composite guide point requiring a plurality of turn guides, the external server 20 may divide the guide point into a first point 1601 and a second point 1602. The first point 1601 may mean a point at which a first turn guide is required at the guide point. The second point 1602 may mean a point at which a second turn guide is required at the guide point. The external server 20 may divide the guide point into a first point, a second point, and a third point if three turns are required.

The external server 20 may generate AR image information on each of the first point 1601 and the second point 1602. That is, the external server 20 may generate the first AR image information 1610 on the first point 1601 and the second AR image information 1620 on the second point 1602.

The first AR image information 1610 may be generated through steps of setting a search area for the first point 1601, selecting an image providing vehicle according to priority, and displaying an AR graphical object in a camera image with respect to the first point 1601. The first AR image information 1610 may include at least one of a carpet, TBT, a remaining distance indication bar, and driving guidance information.

The second AR image information 1620 may be generated through steps of setting a search area for the second point 1602, selecting an image providing vehicle according to priority, and displaying an AR graphical object on a camera image with respect to the second point 1602. The second AR image information 1620 may include at least one of a carpet, TBT, a remaining distance indication bar, and driving guidance information.

The vehicle 10 may receive the first AR image information 1610 and the second AR image information 1620 from the external server 20. The vehicle 10 may display the first AR image information 1610 and the second AR image information 1620 along with an image 1630 captured by a camera mounted on the vehicle 10 on one area of the navigation screen.

The vehicle 10 may display the first AR image information 1610 and the second AR image information 1620 until the host vehicle passes through the first point 1601. When the host vehicle has passed through the first point 1601, the vehicle 10 may display the first AR image information 1610 until the host vehicle passes through the second point 1602. The vehicle 10 may delete the second AR image information 1620 when the host vehicle has passed through the first point 1601. When the vehicle 10 has passed through the first point 1601, only the first AR image information 1610 is displayed, thereby avoiding redundant image supply for the same section.

At least one of the autonomous vehicle 10, the user terminal, and the server of the present disclosure may be associated or fused with an artificial intelligence module, a drone (unmanned aerial vehicle (UAV)), a robot, an augmented reality (AR) device, a virtual reality (VR) device, and devices related to 5G services.

For example, the autonomous vehicle 10 may operate in association with at least one artificial intelligence module and robot included in the vehicle 10.

For example, the vehicle 10 may interact with at least one robot. The robot may be an autonomous mobile robot (AMR) capable of moving by itself. The mobile robot is free to move because it can move by itself and is provided with a plurality of sensors for avoiding obstacles while moving, and thus it can move while avoiding obstacles. The mobile robot may be a flying robot (e.g., a drone). The mobile robot may be a wheeled robot having at least one wheel and moving through rotation of the wheel. The mobile robot may be a legged robot having at least one leg and moving using the leg.

A robot can serve as a device that complements the convenience of a vehicle user. For example, the robot may execute a function of moving a load loaded in the vehicle 10 to a final destination of the user. For example, the robot may execute a function of guiding a user who has alighted from the vehicle 10 to a final destination. For example, the robot may execute a function of transporting a user who has alighted from the vehicle 10 to a final destination.

At least one electronic device included in the vehicle 10 may communicate with a robot through the communication device 220.

The at least one electronic device included in the vehicle 10 may provide data processed thereby to the robot. For example, the at least one electronic device included in the vehicle 10 may provide, to the robot, at least one of object data indicating objects around the vehicle 10, map data, status data regarding the vehicle 10, and location data and driving plan data of the vehicle 10.

The at least one electronic device included in the vehicle 10 may receive data processed by the robot from the robot. The at least one electronic device included in the vehicle 10 may receive at least one of sensing data generated by the robot, object data, robot status data, robot position data, and robot movement plan data.

The at least one electronic device included in the vehicle 10 may generate a control signal based on data received from the robot. For example, the at least one electronic device included in the vehicle 10 may compare information on an object generated by the object detection device with information on the object generated by the robot and generate a control signal based on the comparison result. The at least one electronic device included in the vehicle 10 may generate a control signal such that interference between a movement route of the vehicle 10 and a movement route of the robot does not occur.

At least one electronic device included in the vehicle 10 may include a software module or a hardware module (hereinafter, referred to as an artificial intelligence module) for implementing artificial intelligence (AI). The at least one electronic device included in the vehicle 10 may input acquired data to the artificial intelligence module and use data output from the artificial intelligence module.

The artificial intelligence module may perform machine learning on input data using at least one artificial neural network (ANN). The artificial intelligence module may output driving plan data through machine learning performed on input data.

The at least one electronic device included in the vehicle 10 may generate a control signal based on data output from the artificial intelligence module.

According to an embodiment, the at least one electronic device included in the vehicle 10 may receive data processed by artificial intelligence from an external device through the communication device 220. The at least one electronic device included in the vehicle 10 may generate a control signal based on data processed by artificial intelligence.

The present disclosure described above can be implemented as computer-readable code on a medium in which a program is recorded. Computer-readable media include all types of recording devices in which data readable by a computer system is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc. Further, computer-readable media may be implemented in the form of a carrier wave (e.g., transmission over the Internet). In addition, the computer may include a processor or a control unit. Accordingly, the above detailed description should not be construed as restrictive in all respects but as exemplary. The scope of the present disclosure should be determined by reasonable interpretation of the appended claims, and all modifications within the equivalent scope of the present invention are included in the scope of the present disclosure.

The invention claimed is:

1. An AR image provision method of a vehicle navigation system, comprising:
   receiving, by a server, information on a guide point or information on a vehicle speed from a vehicle;
   searching, by the server, for candidate vehicles based on the information on the guide point or the information on the vehicle speed;
   selecting, by the server, an image providing vehicle from among the candidate vehicles according to priority set;
   generating, by the server, a graphical object to be displayed in a camera image received from the image providing vehicle using augmented reality (AR); and
   wherein the searching comprises, by the server:
   setting a search area including a first area providing an image and a second area that is a preset additional area, based on the guide point; and
   predicting other vehicles located in the search area,
   wherein the AR image provision method further comprises:
   in response to the vehicle speed of the vehicle corresponding to a first speed, providing, by the server, a first image based on a first image providing distance for the guide point; and
   in response to the vehicle speed of the vehicle corresponding to a second speed less than the first speed, providing, by the server, a second image based on a second image providing distance for the guide point, wherein the second image providing distance is less than the first image providing distance.

2. The AR image provision method according to claim 1, wherein the vehicle and the server transmit/receive information to/from each other through 5G communication.

3. The AR image provision method according to claim 1, wherein the predicting comprises, by the server, periodically receiving location information and speed information of each vehicle communicating with the server, and predicting other vehicles located in the search area based on the location information and the speed information of each vehicle.

4. The AR image provision method according to claim 1, wherein the searching comprises verifying, by the server, whether each of other vehicles passes through the guide point according to a stored protocol upon predicting that the other vehicles will be located in the search area.

5. The AR image provision method according to claim 4, wherein the searching comprises selecting, as a candidate vehicle, another vehicle that has been verified as passing through the guide point among the other vehicles.

6. The AR image provision method according to claim 5, wherein the selecting comprises:
   determining the number of candidate vehicles in the search area;
   when the number of the candidate vehicles is one, selecting the selected candidate vehicle as the image providing vehicle; and
   when the number of the candidate vehicles is plural, selecting the image providing vehicle according to priority.

7. The AR image provision method according to claim 6, wherein the selecting further comprises selecting, by the server, a first image providing vehicle according to a criterion of priority selected by the processor,
   wherein the criterion of priority includes a vehicle that is a relatively short distance from the guide point or a vehicle that is a relatively long distance from the guide point within the first area.

8. The AR image provision method according to claim 7, further comprising providing a camera image when the first image providing vehicle enters the first area;
   wherein the camera image is at least one of an image captured by a camera mounted in the first image providing vehicle or an image captured by a camera mounted in a mobile terminal inside the first image providing vehicle.

9. The AR image provision method according to claim 8, further comprising:
   terminating provision of the camera image when the first image providing vehicle has passed through the guide point; and
   selecting, by the server, a second image providing vehicle from among the candidate vehicles according to the selected criterion of priority.

10. The AR image provision method according to claim 9, wherein the selecting of the second image providing vehicle comprises re-verifying, by the server, whether the second image providing vehicle passes through the guide point according to a stored protocol.

11. The AR image provision method according to claim 10, further comprising providing the camera image when the second image providing vehicle enters the first area when the second image providing vehicle has been re-verified as passing through the guide point.

12. The AR image provision method according to claim 6, wherein the server determines that a section around the guide point is a congested section if the number of candidate vehicles is equal to or greater than a preset number, and resets the search area based on a starting point of the congested section.

13. The AR image provision method according to claim 12, wherein the server receives instantaneously captured images from respective vehicles in the congested section and connects the instantaneously captured images to generate the camera image.

14. The AR image provision method according to claim 1, wherein the generating comprises:
   receiving, by the server, stored calibration parameter values in the vehicle from the vehicle;
   performing, by the server, calibration of the camera image based on the calibration parameter values; and
   generating a graphical object to be displayed on the calibrated camera image.

15. The AR image provision method according to claim 14, wherein the graphical object includes at least one of a carpet for guiding a driving route of a host vehicle, turn by turn (TBT), and a bar indicating a remaining distance to the guide point.

16. The AR image provision method according to claim 1, wherein the server divides the guide point into a first point and a second point and generates first AR image information on the first point and second AR image information on the second point upon determining that the guide point is a point requiring a plurality of turn guides, and
   transmits the first AR image information and the second AR image information to the vehicle.

17. An AR image displaying method of a vehicle navigation system, comprising:
   transmitting, by a processor of the vehicle, information on a guide point or information on a vehicle speed to an external server;
   receiving, by the processor, a camera image of an image providing vehicle and a graphic object to be displayed on the camera image using AR from the external server;
   displaying, by the processor, AR image information on the guide point including the camera image and the graphical object on a navigation screen;
   wherein the image providing vehicle is set by:
   selecting a candidate vehicle passing the guide point from among other vehicles located in a search area including a first area providing an image and a second area that is a preset additional area, based on the guide point, and
   selecting the image providing vehicle according to a preset priority from the selected candidate vehicle,
   wherein the displaying comprises:
   in response to the vehicle speed of the vehicle corresponding to a first speed, displaying, by a processor of the vehicle, a first image based on a first image providing distance for the guide point; and
   in response to the vehicle speed of the vehicle corresponding to a second speed less than the first speed, displaying, by a processor of the vehicle, a second image based on a second image providing distance for the guide point, wherein the second image providing distance is less than the first image providing distance.

18. The AR image displaying method according to claim 17, wherein the transmitting comprises:
   selecting, by the processor, the guide point on a route guided by a navigation system based on a selection signal input by a user; and
   transmitting, by the processor, information on the guide point including location information and driving direction information on the guide point to the external server.

19. The AR image displaying method according to claim 17, wherein the displaying comprises:
   receiving, by the processor, AR image information on the guide point including the camera image and the graphical object from the external server; and
   displaying, by the processor, the AR image information in which the graphical object is superimposed on the camera image on an area of the navigation screen.

20. The AR image displaying method according to claim 17,
   wherein the guide point includes a first point and a second point,
   wherein the receiving comprises:
   receiving, by the processor, first AR image information on the first point and second AR image information on the second point,
   wherein the displaying comprises:
   displaying, by the processor, the first AR image information and the second AR image information on an area of the navigation screen,
   displaying, by the processor, the first AR image information and the second AR image information until the host vehicle passes through the first point, and
   displaying, by the processor, the first AR image information until the host vehicle passes through the second point, when the host vehicle has passed through the first point.

* * * * *